United States Patent
Shim et al.

(10) Patent No.: US 11,237,688 B2
(45) Date of Patent: Feb. 1, 2022

(54) TOUCH SENSING UNIT, DISPLAY DEVICE INCLUDING THE TOUCH SENSING UNIT, AND METHOD OF AGING THE TOUCH SENSING UNIT

(71) Applicant: SAMSUNG DISPLAY CO., LTD., Yongin-si (KR)

(72) Inventors: Chan Wook Shim, Asan-si (KR); Sang Hyuk Kwon, Seoul (KR); Jong Yeul Park, Asan-si (KR); Jae Yoon Jung, Seoul (KR); Duc Han Cho, Asan-si (KR); Cheol Gon Choi, Yongin-si (KR)

(73) Assignee: SAMSUNG DISPLAY CO., LTD., Yongin-si (KR)

( * ) Notice: Subject to any disclaimer, the term of this patent is extended or adjusted under 35 U.S.C. 154(b) by 0 days.

(21) Appl. No.: 16/752,882

(22) Filed: Jan. 27, 2020

(65) Prior Publication Data
US 2020/0293134 A1    Sep. 17, 2020

(30) Foreign Application Priority Data
Mar. 15, 2019    (KR) .................... 10-2019-0030001

(51) Int. Cl.
*G06F 3/047* (2006.01)
*G06F 3/044* (2006.01)

(52) U.S. Cl.
CPC ............ *G06F 3/047* (2013.01); *G06F 3/0445* (2019.05); *G06F 2203/04111* (2013.01)

(58) Field of Classification Search
None
See application file for complete search history.

(56) References Cited

U.S. PATENT DOCUMENTS

| | | | | |
|---|---|---|---|---|
| 2013/0321010 | A1* | 12/2013 | Cooley | G06F 3/0446 324/750.01 |
| 2015/0084912 | A1* | 3/2015 | Seo | G02F 1/13338 345/174 |
| 2016/0364068 | A1* | 12/2016 | Cheng | G09G 3/006 |

FOREIGN PATENT DOCUMENTS

KR    10-2016-0101296    8/2016

* cited by examiner

*Primary Examiner* — Matthew Yeung
(74) *Attorney, Agent, or Firm* — F. Chau & Associates, LLC

(57) ABSTRACT

A touch sensing unit includes a base layer including a touch sensing area and a touch peripheral area, a touch electrode disposed in the touch sensing area, a touch line disposed in the touch peripheral area and electrically connected to the touch electrode, an inspection pad disposed in a pad area located at one side of the touch peripheral area, and an inspection thin film transistor disposed in the pad area and electrically connected to the touch line and the inspection pad.

19 Claims, 18 Drawing Sheets

TOUCH SENSING UNIT, DISPLAY DEVICE INCLUDING THE TOUCH SENSING UNIT, AND METHOD OF AGING THE TOUCH SENSING UNIT

CROSS-REFERENCE TO RELATED APPLICATION

This application claims priority under 35 U.S.C. § 119 to Korean Patent Application No. 10-2019-0030001, filed on Mar. 15, 2019 in the Korean Intellectual Property Office, the disclosure of which is incorporated by reference herein in its entirety.

TECHNICAL FIELD

Exemplary embodiments of the inventive concept relate to a touch sensing unit, a display device including the touch sensing unit, and a method of aging the touch sensing unit.

DISCUSSION OF RELATED ART

Display devices are used in various electronic appliances for displaying or providing an image to a user, such as smart phones, tablet PCs, digital cameras, notebook computers, navigators, and televisions. A display device includes a display panel for generating and displaying the image and various input devices.

Recently, in the fields of smart phones and tablet PCs, a touch sensing unit recognizing a touch input has widely been used in display devices. In a process of manufacturing the touch sensing unit, a short between touch electrodes may occur due to foreign matter, causing a malfunction of the touch sensing unit. To prevent the short due to the foreign matter and overcome this malfunction, an aging method may be used where a predetermined voltage is applied to the touch sensing unit.

SUMMARY

According to an exemplary embodiment of the inventive concept, a touch sensing unit includes a base layer including a touch sensing area and a touch peripheral area, a touch electrode disposed in the touch sensing area, a touch line disposed in the touch peripheral area and electrically connected to the touch electrode, an inspection pad disposed in a pad area located at one side of the touch peripheral area, and an inspection thin film transistor disposed in the pad area and electrically connected to the touch line and the inspection pad.

The touch line may include a plurality of touch lines sequentially arranged in a first direction in the pad area, and the inspection thin film transistor may be disposed on only odd-numbered touch lines of the plurality of touch lines.

The touch line may include a first driving line, a second driving line, and a third driving line, which are sequentially arranged in a first direction in the pad area, the inspection pad may include a first inspection pad connected to the first driving line, a second inspection pad connected to the second driving line, and a third inspection pad connected to the third driving line, the inspection thin film transistor may include a first inspection thin film transistor, a second inspection thin film transistor, a third inspection thin film transistor, and a fourth inspection thin film transistor, and a first electrode of the first inspection thin film transistor may be connected to the first driving line, and a second electrode of the first inspection thin film transistor may be connected to the first inspection pad.

A first electrode of the second inspection thin film transistor may be connected to the third driving line, and a second electrode of the second inspection thin film transistor may be connected to the third inspection pad.

The touch line may further include a first sensing line, a second sensing line, and a third sensing line, which are sequentially arranged in the first direction in the pad area, the inspection pad may include a fourth inspection pad connected to the first sensing line, a fifth inspection pad connected to the second sensing line, and a sixth inspection pad connected to the third sensing line, and a first electrode of the third inspection thin film transistor may be connected to the first sensing line, and a second electrode of the third inspection thin film transistor may be connected to the fourth inspection pad.

A first electrode of the fourth inspection thin film transistor may be connected to the third sensing line, and a second electrode of the fourth inspection thin film transistor may be connected to the sixth inspection pad.

The inspection pad may further include a seventh inspection pad, and the seventh inspection pad may be connected to a control electrode of each of the first inspection thin film transistor, the second inspection thin film transistor, the third inspection thin film transistor, and the fourth inspection thin film transistor.

The inspection thin film transistor may further include a fifth inspection thin film transistor and a sixth inspection thin film transistor, and a first electrode of the fifth inspection thin film transistor may be connected to the second driving line, and a second electrode of the fifth inspection thin film transistor may be connected to the second inspection pad.

A first electrode of the sixth inspection thin film transistor may be connected to the second sensing line, and a second electrode of the sixth inspection thin film transistor may be connected to the fifth inspection pad.

The inspection pad may further include an eighth inspection pad, and the eighth inspection pad may be connected to a control electrode of each of the fifth inspection thin film transistor and the sixth inspection thin film transistor.

The touch sensing unit may include a touch pad disposed between the touch line and the inspection thin film transistor and electrically connected to the touch line and the inspection thin film transistor.

The touch sensing unit may include a touch pad disposed between the inspection thin film transistor and the inspection pad and electrically connected to the inspection thin film transistor and the inspection pad.

According to an exemplary embodiment of the inventive concept, a display device, may include a substrate including a display area and a non-display area, a thin film transistor layer disposed on the substrate and including a driving thin film transistor and an inspection thin film transistor, a light emitting element layer disposed on the thin film transistor layer, and a touch sensing unit disposed on the light emitting element layer. The driving thin film transistor may be disposed in the display area, and the inspection thin film transistor may be disposed in the non-display area and on the same layer as the driving thin film transistor.

The touch sensing unit may include a touch line, and the touch line is electrically connected to the inspection thin film transistor.

According to an exemplary embodiment of the inventive concept, a method of aging a touch sensing unit may include applying a gate-off voltage to a first node inspection pad connected to a first node, and inputting first aging signals to inspection pads connected to a plurality of touch lines to form a potential difference between the plurality of touch lines.

The plurality of touch lines may be sequentially arranged in a first direction, inspection thin film transistors may be connected only to odd-numbered touch lines of the plurality of touch lines, and the gate-off voltage may be applied to the inspection thin film transistors connected to the first node.

The plurality of touch lines may include a first driving line, a second driving line, and a third driving line, which are sequentially arranged in the first direction, the inspection pads may include a first inspection pad connected to the first driving line, a second inspection pad connected to the second driving line, and a third inspection pad connected to the third driving line, and the inspection thin film transistors may include a first inspection thin film transistor connected to the first driving line and the first inspection pad and a second inspection thin film transistor connected to the third driving line and the third inspection pad.

The plurality of touch lines may further include a first sensing line, a second sensing line, and a third sensing line, which are sequentially arranged in the first direction, the inspection pads may further include a fourth inspection pad connected to the first sensing line, a fifth inspection pad connected to the second sensing line, and a sixth inspection pad connected to the third sensing line, and the inspection thin film transistors may further include a third inspection thin film transistor connected to the first sensing line and the fourth inspection pad and a fourth inspection thin film transistor connected to the third sensing line and the sixth inspection pad.

A control electrode of each of the first inspection thin film transistor, the second inspection thin film transistor, the third inspection thin film transistor, and the fourth inspection thin film transistor may be connected to the first node.

The method may further include applying a gate-on voltage to the first node inspection pad connected to the first node, and applying the first aging signals to each of the first to third inspection pads, and applying second aging signals to each of the fourth to sixth inspection pads.

BRIEF DESCRIPTION OF THE DRAWINGS

The above and other aspects and features of the inventive concept will become more apparent by describing in detail exemplary embodiments thereof with reference to the attached drawings.

DETAILED DESCRIPTION OF THE EMBODIMENTS

Figure 1:
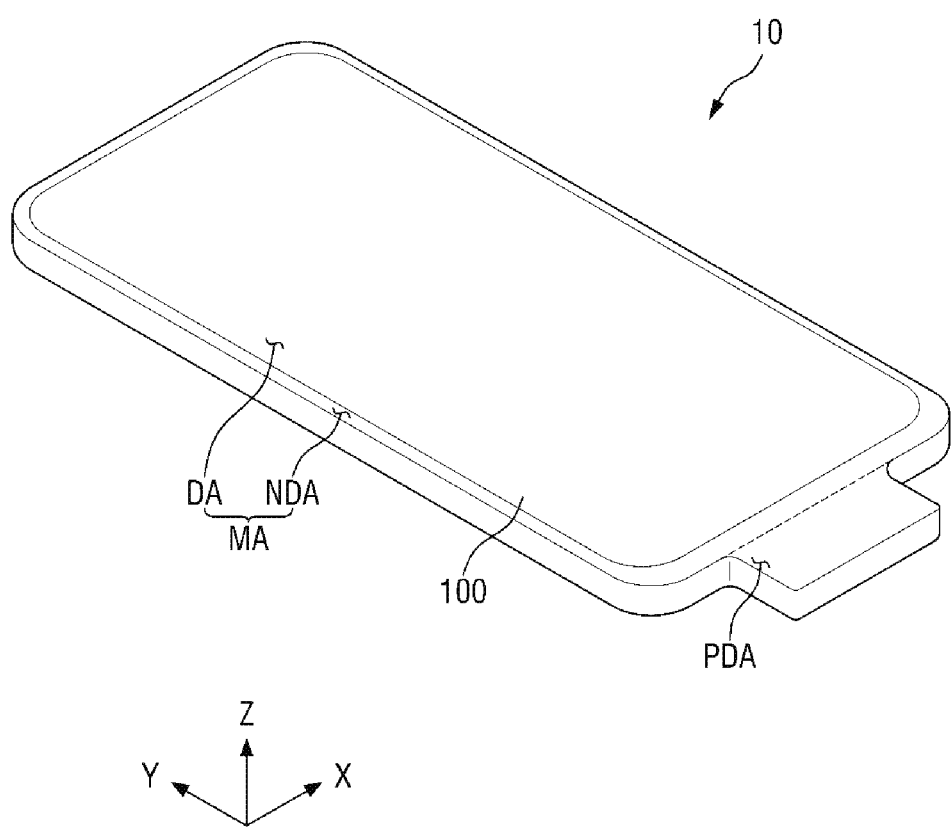
FIG. 1 is a perspective view of a display device according to an exemplary embodiment of the inventive concept.

Exemplary embodiments of the inventive concept provide a touch sensing unit which can prevent not only a short between touch electrodes but also a short between touch wirings by using an aging method, and a display device including the touch sensing unit.

Exemplary embodiments of the inventive concept also provide an aging method which can prevent not only a short between touch electrodes but also a short between touch wirings.

Exemplary embodiments of the inventive concept will be described more fully hereinafter with reference to the accompanying drawings. Like reference numerals may refer to like elements throughout this application.

The terminology used herein is for the purpose of describing particular exemplary embodiments only and is not intended to be limiting of the inventive concept. As used herein, the singular forms "a", "an", and "the" are intended to include the plural forms as well, unless the context clearly indicates otherwise.

It will be understood that when an element or layer is referred to as being "on", "connected to", or "coupled to" another element or layer, it can be directly on, connected, or coupled to the other element or layer or intervening elements or layers may be present. In contrast, when an element is referred to as being "directly on", "directly connected to", or "directly coupled to" another element or layer, there are no intervening elements or layers present.

It will be understood that, although the terms first, second, etc. may be used herein to describe various elements, components, regions, layers, and/or sections, these elements, components, regions, layers, and/or sections should not be limited by these terms. These terms are only used to distinguish one element, component, region, layer, or section from another region, layer, or section. Thus, a first element, component, region, layer, or section discussed below could be termed a second element, component, region, layer, or section without departing from the teachings of the inventive concept.

Spatially relative terms, such as "beneath", "below", "lower", "above", "upper", and the like, may be used herein for ease of description to describe one element or feature's relationship to another element(s) or feature(s) as illustrated in the figures. It will be understood that the spatially relative terms are intended to encompass different orientations of the device in use or operation in addition to the orientation depicted in the figures. For example, if the device in the figures is turned over, elements described as "below" or "beneath" other elements or features would then be oriented "above" the other elements or features. Thus, the exemplary term "below" can encompass both an orientation of above and below. The device may be otherwise oriented (rotated 90 degrees or at other orientations) and the spatially relative descriptors used herein should be interpreted accordingly.

Figure 2:
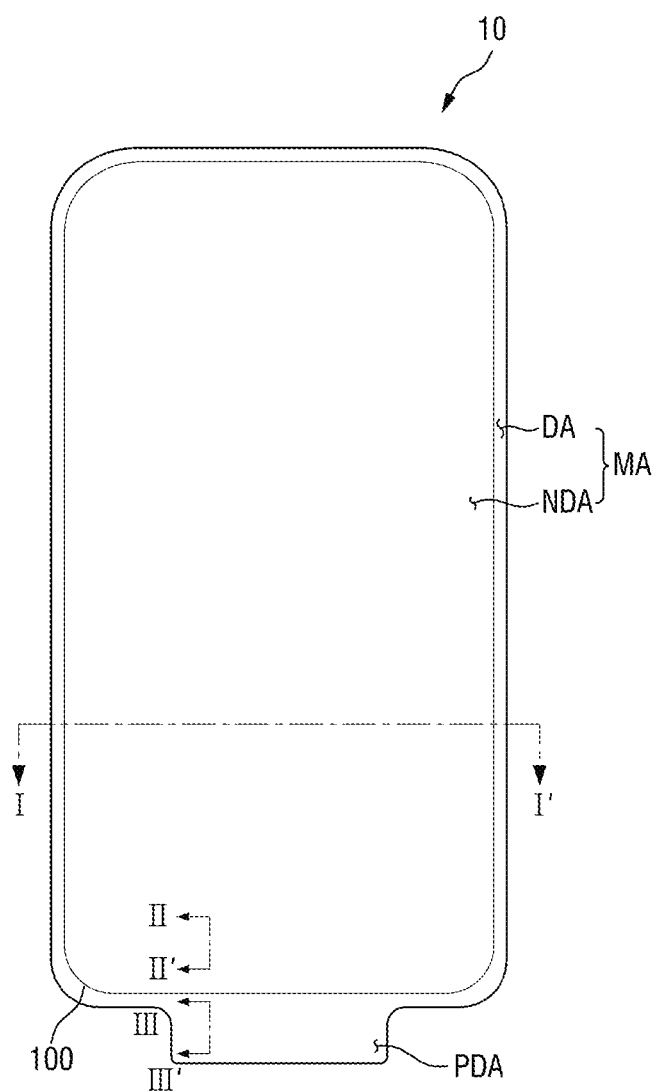
FIG. 2 is a plan view of a display device according to an exemplary embodiment of the inventive concept.

FIG. 1 is a perspective view of a display device according to an exemplary embodiment of the inventive concept. FIG. 2 is a plan view of a display device according to an exemplary embodiment of the inventive concept.

In this specification, "on", "over", "top", "upper side", or "upper surface" refers to an upward direction with respect to a display panel 100, e.g., a Z-axis direction, and "beneath", "under", "bottom", "lower side", or "lower surface" refers to a downward direction with respect to the display panel 100, e.g., a direction opposite to the Z-axis direction. Further, "left", "right", "upper", and "lower" refer to directions when the display panel 100 is viewed from the plane. For example, "left" refers to a direction opposite to the X-axis direction, "right" refers to the X-axis direction, "upper" refers to the Y-axis direction, and "lower" refers to a direction opposite to the Y-axis direction.

Referring to FIGS. 1 and 2, a display device 10 is a device for displaying a moving image or a still image. The display device 10 may be used as a display screen for various products such as televisions, notebooks, monitors, billboards, and internets of things as well as portable electronic appliances such as mobile phones, smart phones, tablet personal computers (PCs), smart watches, watch phones, mobile communication terminals, electronic notebooks, electronic books, portable multimedia players (PMPs), navigators, and ultra mobile PCS (UMPs). The display device 10 may be any one of an organic light emitting display (LED) device, a liquid crystal display device, a plasma display device, a field emission display device, an electrophoretic display device, an electrowetting display device, a quantum dot emission display device, or a micro LED display device. Hereinafter, the display device 10 will be described assuming that the display device 10 is an organic light emitting display device, but the inventive concept is not limited thereto.

The display device 10 according to an exemplary embodiment of the inventive concept includes the display panel 100.

The display panel 100 may include a main area MA and a pad area PDA protruding from one side of the main area MA.

The main area MA may have a rectangular planar shape having short sides in the first direction (X-axis direction) and long sides in the second direction (Y-axis direction). The corner where the short side in the first direction (X-axis direction) meets the long side in the second direction (Y-axis direction) may be formed to have a round shape of a predetermined curvature or have a right angle shape. The planar shape of the display device 10 is not limited to a rectangular shape, and may be formed in another polygonal shape, circular shape, or elliptical shape. The main area MA may be formed to be flat, but is not limited thereto, and may include a curved portion formed at left and right ends. In this case, the curved portion may have a constant curvature or a variable curvature.

The main area MA may include a display area DA where pixels are formed to display an image, and a non-display area NDA which is a peripheral area of the display area DA.

In the display area DA, not only pixels but also scan lines, data lines, and power supply lines, which are connected to the pixels, may be arranged. When the main area MA includes the curved portion, the display area DA may be disposed in the curved portion. In this case, the image of the display panel 100 may also be seen even on the curved portion.

The non-display area NDA may be defined as an area from the outside of the display area DA to the edge of the display panel 100. In the non-display area NDA, a scan driver for applying scan signals to scan lines, and link lines for connecting data lines to a display driving circuit 200 may be arranged.

The pad area PDA may protrude from one side of the main area MA. For example, the pad area PDA may protrude from the lower side of the main area MA as shown in FIG. 2. The length of the pad area PDA in the first direction (X-axis direction) may be shorter than the length of the main area MA in the first direction (X-axis direction). However, the inventive concept is not limited thereto. In exemplary embodiments of the inventive concept, the length of the pad area PDA in the first direction (X-axis direction) may also be longer than the length of the main area MA in the first direction (X-axis direction).

The display panel 100 may be formed to be flexible such that it may be bent, warped, folded, or rolled. In this case, the display panel 100 may be bent in a thickness direction (Z-axis direction). One side of the pad area PDA of the display panel 100 faces upward (e.g., in the Z-axis direction) before the display panel 100 is bent, but one side of the pad area PDA of the display panel 100 faces downward (e.g., in the Z-axis direction) after the display panel 100 is bent. Thus, since the pad area PDA is disposed under the main area MA, the pad area PDA may overlap the main area MA.

The pad area PDA of the display panel 100 may be provided with pads electrically connected to a display driving circuit and a circuit board.

Figure 3:
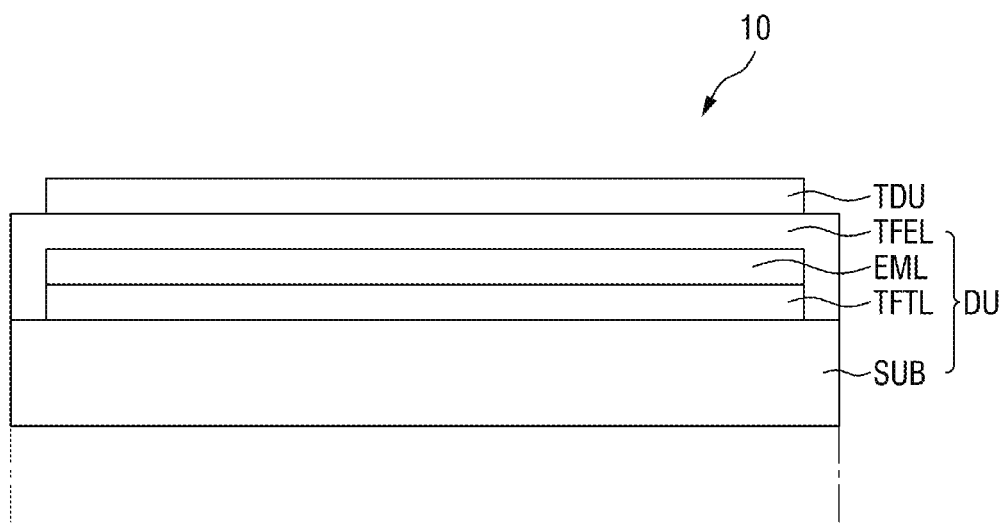
FIG. 3 is a cross-sectional view taken along the line I-I' of FIG. 2 according to an exemplary embodiment of the inventive concept.

FIG. 3 is a cross-sectional view taken along the line I-I' of FIG. 2 according to an exemplary embodiment of the inventive concept.

Referring to FIG. 3, the display device 10 may include a display unit DU and a touch sensing unit TDU. The display unit DU may include a substrate SUB, a thin film transistor layer TFTL disposed on the substrate SUB, a light emitting element layer EML disposed on the thin film transistor layer TFTL, and a thin film encapsulation layer TFEL disposed on the light emitting element layer EML. The touch sensing unit TDU may be disposed on the thin film encapsulation layer TFEL.

The substrate SUB may include an insulating material such as glass, quartz, or a polymer resin. Examples of the polymer resin may include polyethersulphone (PES), polyacrylate (PA), polyarylate (PAR), polyetherimide (PEI), polyethylene napthalate (PEN), polyethylene terepthalate (PET), polyphenylene sulfide (PPS), polyallylate, polyimide (PI), polycarbonate (PC), cellulose triacetate (CAT), cellulose acetate propionate (CAP), or combinations thereof. Alternatively, the substrate SUB may include a metal material.

The substrate SUB may be a rigid substrate or a flexible substrate capable of bending, folding, rolling, or the like. When the substrate SUB is a flexible substrate, it may be formed of polyimide (PI), but the inventive concept is not limited thereto.

Figure 4:
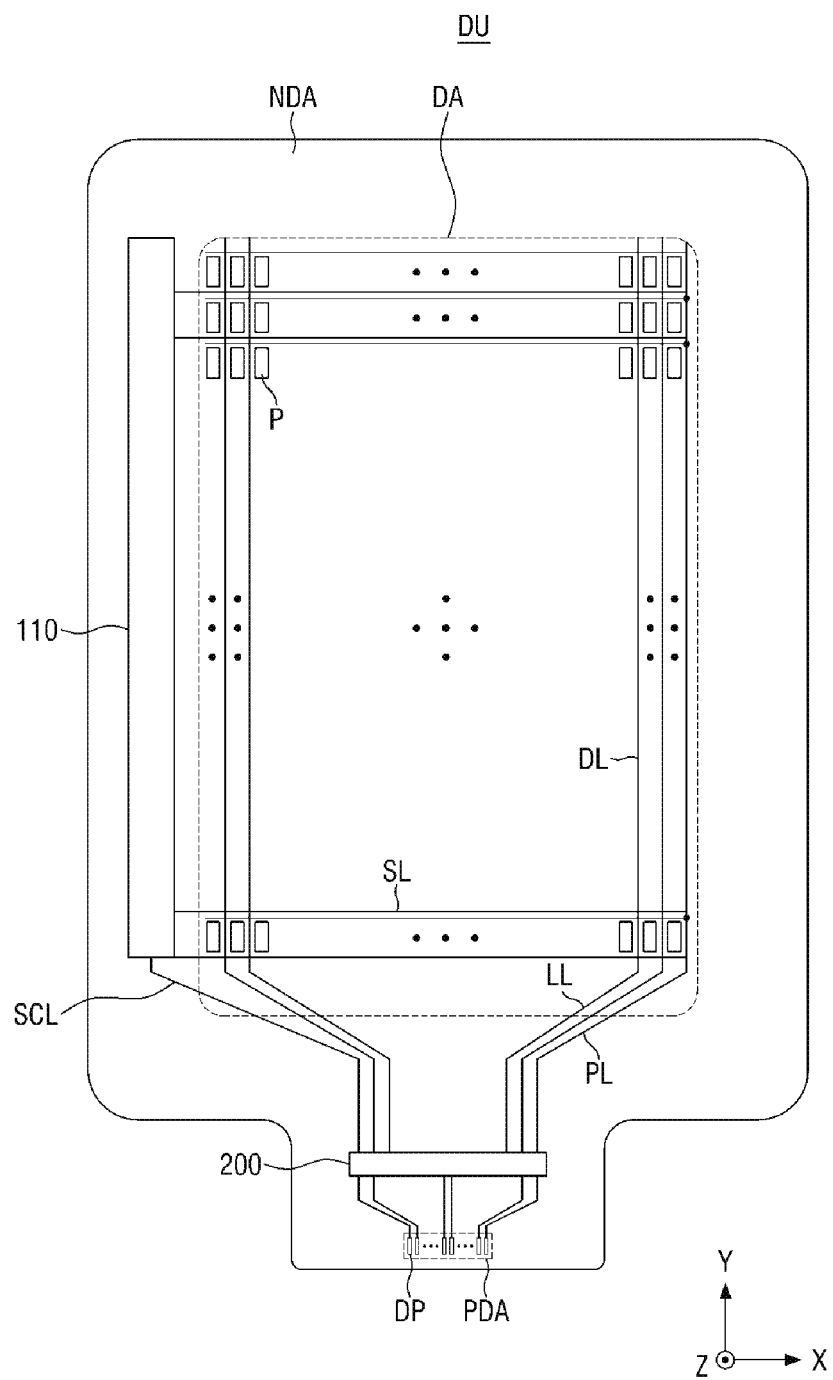
FIG. 4 is a plan view showing a display unit of FIG. 3 according to an exemplary embodiment of the inventive concept.

The thin film transistor layer TFTL may be disposed on the substrate SUB. The thin film transistor layer TFTL may be provided with not only thin film transistors of each pixel but also scan lines, data lines, power supply lines, scan control lines, and routing lines for connecting pads and data lines. Each of the thin film transistors may include a gate electrode, a semiconductor layer, a source electrode, and a drain electrode. When a scan driver 110 is formed in the non-display area NDA of the display panel 100 as shown in FIG. 4, the scan driver 110 may include thin film transistors.

The thin film transistor layer TFTL may be disposed in the display area DA and the non-display area NDA. For example, thin film transistors, scan lines, data lines and power supply lines of each pixel of the thin film transistor layer TFTL may be disposed in the display area DA. Further, scan control lines and link lines of the thin film transistor layer TFTL may be disposed in the non-display area NDA. The thin film transistor layer TFTL may further include inspection thin film transistors connected to inspection pads of the touch sensing unit TDU.

The light emitting element layer EML may be disposed on the thin film transistor layer TFTL. The light emitting element layer EML may include pixels each including a first electrode, a light emitting layer, and a second electrode, and a pixel defining film defining the pixels. The light emitting layer may be an organic light emitting layer including an organic material. In this case, the light emitting layer may include a hole transporting layer, an organic light emitting layer, and an electron transporting layer. When a predetermined voltage is applied to the first electrode through the thin film transistor of the thin film transistor layer TFTL and a cathode voltage is applied to the second electrode, holes and electrons are transferred to the organic light emitting layer through the hole transporting layer and the electron transporting layer, respectively, and are combined with each other to emit light. The pixels of the light emitting element layer EML may be arranged in the display area DA.

The thin film encapsulation layer TFEL may be disposed on the light emitting element layer EML. The thin film encapsulation layer TFEL serves to prevent oxygen or moisture from penetrating into the light emitting element layer EML. For this purpose, the thin film encapsulation layer TFEL may include at least one inorganic film. The inorganic film may be a silicon nitride layer, a silicon oxynitride layer, a silicon oxide layer, a titanium oxide layer, or an aluminum oxide layer, but is not limited thereto. Further, the thin film encapsulation layer TFEL serves to protect the light emitting element layer EML from foreign matter such as dust. For this purpose, the thin film encapsulation layer TFEL may include at least one organic film. The organic film may include an acrylic resin, an epoxy resin, a phenolic resin, a polyamide resin, or a polyimide resin, but the inventive concept is not limited thereto.

The thin film encapsulation layer TFEL may be disposed in both the display area DA and the non-display area NDA. For example, the thin film encapsulation layer TFEL may be disposed to cover the light emitting element layer EML in the display area DA and the non-display area NDA, and cover the thin film transistor layer TFTL in the non-display area NDA.

The touch sensing unit TDU may be disposed on the thin film encapsulation layer TFEL. For example, a part of the thin film encapsulation layer TFEL may be used as a base layer of the touch sensing unit TDU. When the touch sensing unit TDU is disposed directly on the thin film encapsulation layer TFEL, the thickness of the display device 10 may be reduced, compared to when a separate touch panel including the touch sensing unit TDU is attached onto the thin film encapsulation layer TFEL.

The touch sensing unit TDU may include touch electrodes for sensing a user's touch by a capacitance method and touch lines for connecting the touch electrodes and the pads. For example, the touch sensing unit TDU may sense a user's touch by a self-capacitance method or a mutual capacitance method.

Figure 5:
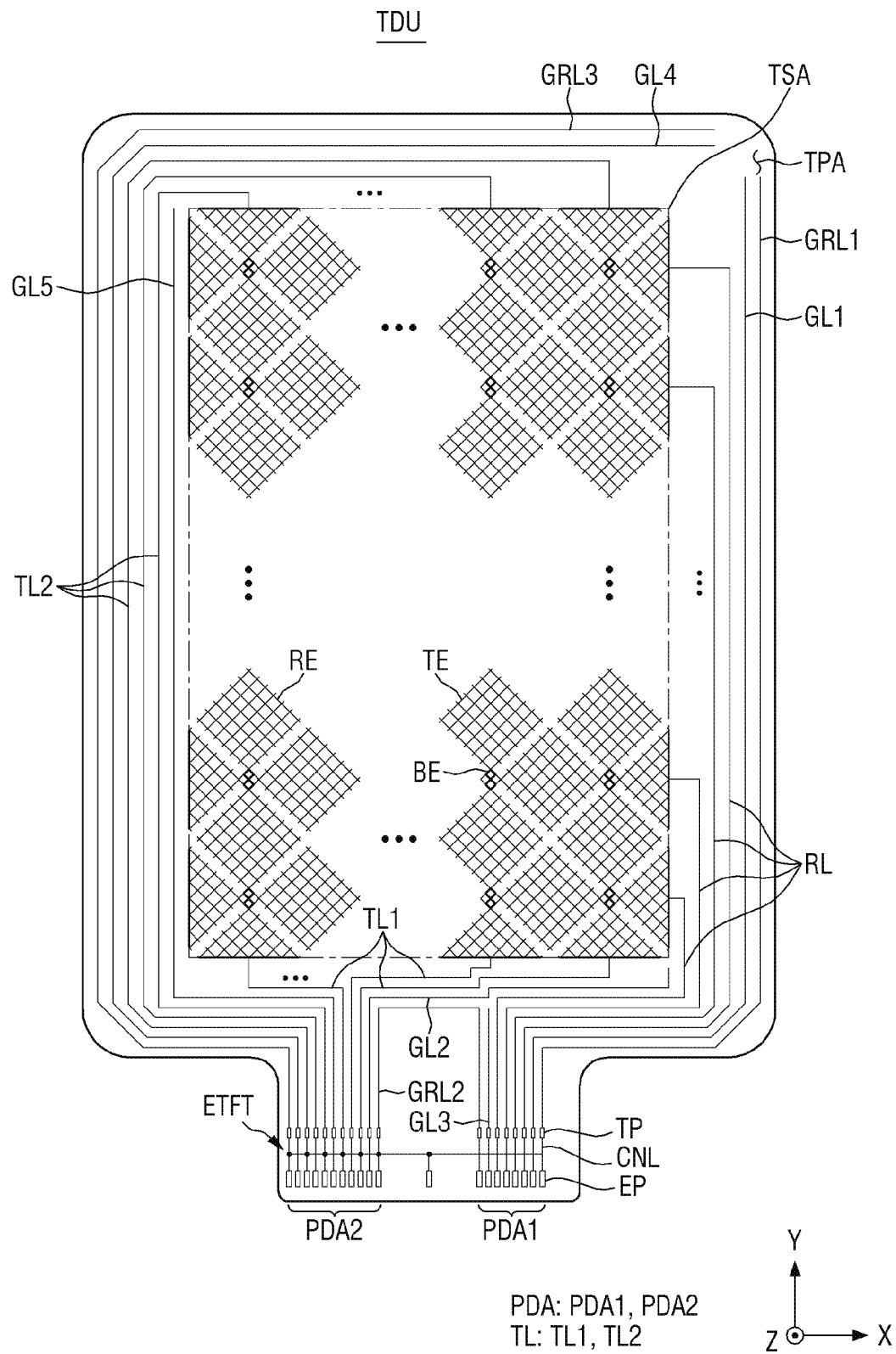
FIG. 5 is a plan view showing a touch sensing unit of FIG. 3 according to an exemplary embodiment of the inventive concept.

The touch electrodes of the touch sensing unit TDU may be arranged in the touch sensing area TSA overlapping the display area DA as shown in FIG. 5. The touch lines of the touch sensing unit TDU may be arranged in a touch peripheral area TPA overlapping the non-display area NDA as shown in FIG. 5.

A cover window may be additionally disposed on the touch sensing unit TDU. In this case, the cover window may be attached onto the touch sensing unit TDU by a transparent adhesive member such as an optically clear adhesive (OCA).

FIG. 4 is a plan view showing a display unit of FIG. 3 according to an exemplary embodiment of the inventive concept.

For convenience of explanation, FIG. 4 shows the display unit DU including pixels P, scan lines SL, data lines DL, power supply lines PL, scan control lines SCL, a scan driver 110, the display driving circuit 200, and display pads DP.

Referring to FIG. 4, the scan lines SL, the data lines DL, the power supply lines PL, and the pixels P are arranged in the display area DA. The scan lines SL may be arranged in a first direction (X-axis direction) substantially in parallel, and the data lines DL may be arranged substantially in parallel in a second direction (Y-axis direction) crossing the first direction (X-axis direction). The power supply lines PL may include at least one line disposed in parallel to the data lines DL in the second direction (Y-axis direction) and a plurality of lines branched from the at least one line in the first direction (X-axis direction).

Each of the pixels P may be connected to at least one of the scan lines SL, one of the data lines DL, and the power supply lines PL. Each of the pixels P may include thin film transistors including a driving transistor, at least one switching transistor, an organic light emitting diode, and a capacitor. When each of the pixels P receives a scan signal from one of the scan lines SL, it may receive a data voltage from one of the data lines DL, and may supply a driving current to an organic light emitting diode in response to the data voltage applied to a gate electrode to emit light.

The scan driver 110 is connected to the display driving circuit 200 through at least one scan control line SCL. The display driving circuit 200 outputs signals and voltages for driving the display panel 100. For example, the display driving circuit 200 may supply the data voltages to the data lines DL. Further, the display driving circuit 200 may supply a power supply voltage to the power supply lines PL, and may supply scan control signals to the scan driver 110. The display driving circuit 200 may be formed as an integrated circuit (IC), and may be mounted on the display panel 100 in the pad area PDA by a chip on glass (COG) method, a chip on plastic (COP) method, or an ultrasonic bonding method. However, the inventive concept is not limited thereto. For example, the display driving circuit 200 may be mounted on a circuit board. The scan driver 110 may receive the scan control signal from the display driving circuit 200, may generate scan signals according to the scan control signal, and may supply the scan signals to the scan lines SL.

Although it is illustrated in FIG. 4 that the scan driver 110 in the non-display area NDA located at the left outside of the display area DA, the inventive concept is not limited thereto. For example, the scan driver 110 may be disposed in the non-display area NDA located at the left and right outsides of the display area DA.

The display driving circuit 200 is connected to the display pads DP to receive digital video data and timing signals. The display driving circuit 200 converts digital video data into analog positive/negative data voltages and supplies the analog positive/negative data voltages to the data lines DL through link lines LL. The display driving circuit 200 generates and supplies a scan control signal for controlling the scan driver 110 through the scan control lines SCL. The pixels P to which data voltages will be supplied are selected by the scan signals of the scan driver 110, and the data voltages are supplied to the selected pixels P. The display driving circuit 200 may be formed as an integrated circuit (IC), and may be attached onto the substrate SUB by a COG method, a COP method, or an ultrasonic bonding method.

Figure 6:
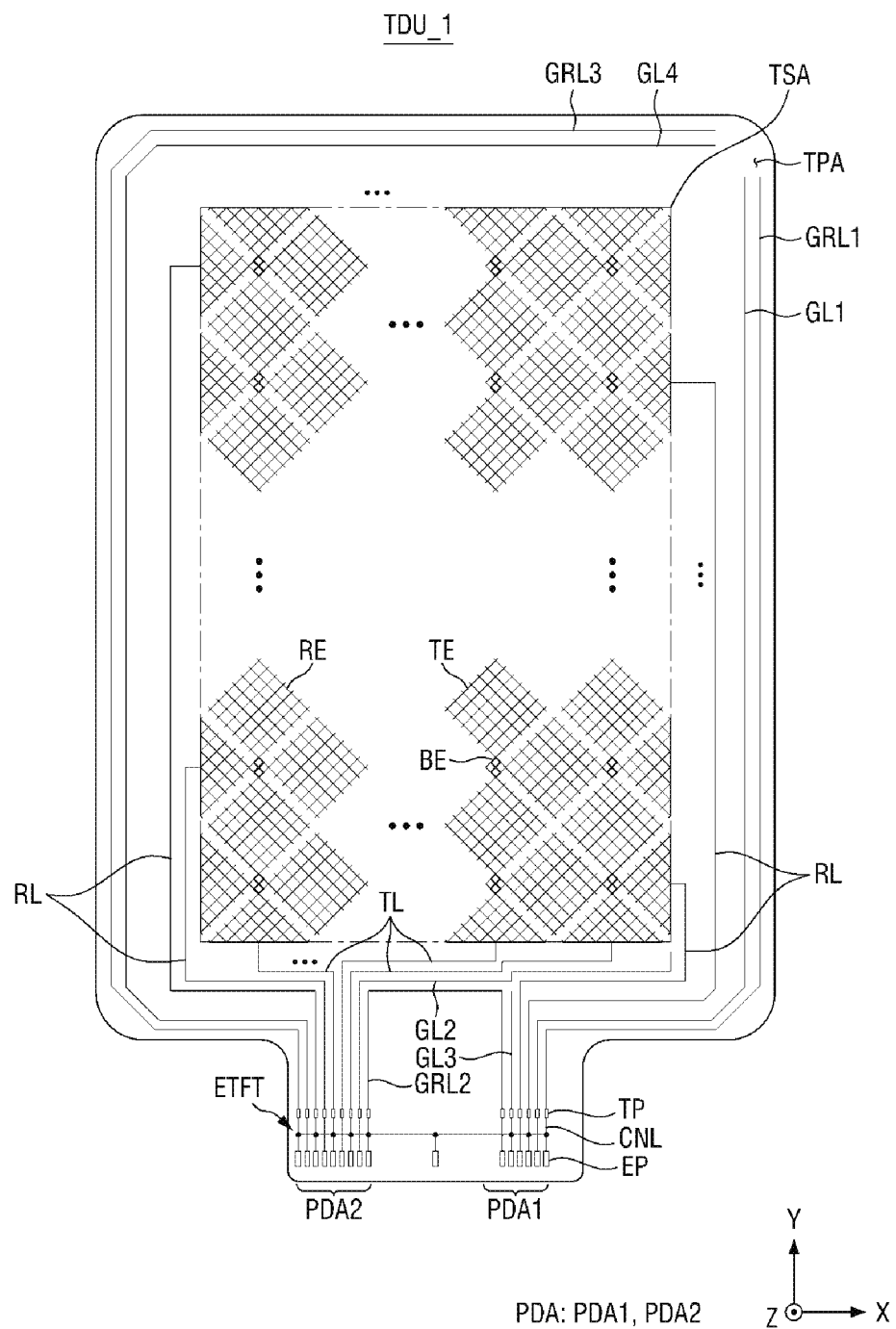
FIG. 6 is a plan view showing the touch sensing unit of FIG. 3 according to an exemplary embodiment of the inventive concept.

FIG. 5 is a plan view showing a touch sensing unit of FIG. 3 according to an exemplary embodiment of the inventive concept, and FIG. 6 is a plan view showing the touch sensing unit of FIG. 3 according to an exemplary embodiment of the inventive concept.

For convenience of explanation, FIGS. 5 and 6 illustrate touch electrodes TE and RE, touch lines TL and RL, touch pads TP, and inspection pads EP.

Referring to FIG. 5, the touch sensing unit TDU includes a touch sensing area TSA for sensing a user's touch and a touch peripheral area TPA disposed around the touch sensing area TSA. The touch sensing area TSA may overlap the display area DA of the display unit DU, and the touch peripheral area TPA may overlap the non-display area NDA of the display unit DU.

The touch electrodes TE and RE may be arranged in the touch sensing area TSA. The touch electrodes TE and RE may include sensing electrodes RE electrically connected in the first direction (X-axis direction) and driving electrodes TE electrically connected in a second direction (Y-axis direction) crossing the first direction (X-axis direction). Although it is illustrated in FIG. 5 that the sensing electrodes RE and the driving electrodes TE are arranged in a diamond-like planar shape, the inventive concept is not limited thereto.

To prevent the short circuit of the sensing electrodes RE and the driving electrodes TE in the crossing regions thereof, the driving electrodes TE adjacent to one another in the second direction (Y-axis direction) may be electrically connected to one another through a connection electrode BE. In this case, the driving electrodes TE and the sensing electrodes RE may be arranged on one layer, and the connection electrode BE may be disposed on a different layer from the driving electrodes TE and the sensing electrodes RE. The sensing electrodes RE electrically connected in the first direction (X-axis direction) may be electrically connected to the driving electrodes TE electrically connected in the second direction (Y-axis direction).

The touch lines TL and RL may be arranged in the touch peripheral area TPA. The touch lines TL and RL may be formed by the same process as the touch electrodes TE and RE. For example, the touch lines TL and RL and the touch electrodes TE and RE may be formed of the same material in the same layer. Therefore, each of the touch lines TL and RL may be directly connected to each of the touch electrodes TE and RE. In other example, the driving lines TL may be indirectly connected to the driving electrodes TE and the sensing lines RL may be indirectly connected to the sensing electrodes RE. Each of the touch lines TL and RL may be connected to a line connection electrode through one contact hole, and the line connection electrode may be connected to each of the touch electrodes TE and RE through another contact hole. The touch lines TL and RL may include sensing lines RL connected to the sensing electrodes RE and first driving lines TL1 and second driving lines TL2 connected to the driving electrodes TE.

The sensing electrodes RE arranged at the right side of the touch sensing area TSA may be connected to the sensing lines RL. For example, among the sensing electrodes RE electrically connected in the first direction (X-axis direction), the sensing electrode RE disposed at the right end thereof may be connected to the sensing line RL. The sensing lines RL may be connected to the touch pads TP arranged in a first pad area PDA1. The touch pads TP arranged in the first pad area PDA1 may be connected to the inspection pads EP arranged in the first pad area PDA1 through connection lines CNL, respectively.

Inspection thin film transistors ETFT may be arranged on the connection lines CNL arranged in the first pad area PDA1. For example, an inspection thin film transistor ETFT may be disposed on an odd-numbered connection line CNL in a direction opposite to the first direction (X-axis direction) among the connection lines CNL arranged in the first pad area PDA1. However, the inventive concept is not limited thereto. In exemplary embodiments of the inventive concept, an inspection thin film transistor ETFT may be disposed on an even-numbered connection line CNL in a direction opposite to the first direction (X-axis direction) among the connection lines CNL arranged in the first pad area PDA1. Further, in exemplary embodiments of the inventive concept, the inspection thin film transistors ETFT may be disposed on some of the connection lines CNL arranged in the first pad area PDA1 and may not disposed on others thereof. In this case, the connection lines CNL on which the inspection thin film transistor ETFT is disposed and the connection lines CNL on which the inspection thin film transistor ETFT is not disposed may be irregularly distributed.

The driving electrodes TE arranged under the touch sensing area TSA may be connected to the first driving lines TL1, and the driving electrodes TE arranged over the touch sensing area TSA may be connected to the second driving lines TL2. For example, the driving electrode TE disposed at the lower end of the driving electrodes TE electrically connected in the second direction (Y-axis direction) may be connected to the first driving line TL1, and the driving electrode TE disposed at the upper end thereof may be connected to the second driving line TL2. The second driving lines TL2 may be connected to the driving electrodes TE at the upper side of the touch sensing area TSA via the left outside of the touch sensing area TSA. The first driving lines TL1 and the second driving lines TL2 may be connected to the touch pads TP arranged in a second pad area PDA2. The touch pads TP arranged in the second pad area PDA2 may be connected to the inspection pads EP arranged in the second pad area PDA2 by the connection lines CNL.

The inspection thin film transistors ETFTs may be arranged on the connection lines CNL arranged in the second pad area PDA2. For example, an inspection thin film transistor ETFT may be disposed on an odd-numbered connection line CNL in a direction opposite to the first direction (X-axis direction) among the connection lines CNL arranged in the second pad area PDA2. However, the inventive concept is not limited thereto. In exemplary embodiments of the inventive concept, an inspection thin film transistor ETFT may be disposed on an even-numbered connection line CNL in a direction opposite to the first direction (X-axis direction) among the connection lines CNL arranged in the second pad area PDA2. Further, in exemplary embodiments of the inventive concept, the inspection thin film transistor ETFT may be disposed on some of the connection lines CNL arranged in the second pad area PDA2 and may not disposed on others thereof. In this case, the connection lines CNL on which the inspection thin film transistor ETFT is disposed and the connection lines CNL on which the inspection thin film transistor ETFT is not disposed may be irregularly distributed.

The arrangement structure of the inspection thin film transistors ETFT, the connection lines CNL, and the inspection pads EP will be described in more detail later.

The touch electrodes TE and RE may be driven by a mutual capacitance method or a self-capacitance method. First, when the touch electrodes TE and RE are driven by a mutual capacitance method, driving signals are supplied to the driving electrodes TE through the first driving lines TL1 and the second driving lines TL2 to charge mutual capacitances formed in the crossing regions of the sensing electrodes RE and the driving electrodes TE. Then, charge change amounts of the mutual capacitances of the sensing electrodes RE are measured through the sensing lines RL, and whether or not touch input is performed is determined according to the charge change amounts of the sensing electrodes RE. The driving signal may be a signal having a plurality of driving pulses.

Second, when the touch electrodes TE and RE are driven by a self-capacitance method, driving signals are supplied to both the driving electrodes TE and the sensing electrodes RE through the first driving lines TL1, the second driving lines TL2, and the sensing lines RL to charge self capacitances of the driving electrodes TE and the sensing electrodes RE. Then, charge change amounts of the self capacitances of the driving electrodes TE and the sensing electrodes RE are measured through the first driving lines TL1, the second driving lines TL2, and the sensing lines RL, and whether or not touch input is performed is determined according to the charge change amounts of the self capacitances.

The driving electrodes TE, the sensing electrodes RE, and the connection electrodes BE may be formed as a mesh-shaped electrode as shown in FIG. 5. When the touch sensing unit TDU including the driving electrodes TE and the sensing electrodes RE is directly formed on the thin film encapsulation film TFEL as shown in FIG. 3, the distance between the second electrode of the light emitting element layer EML and the driving electrode TE or sensing electrode RE of the touch sensing unit TDU is close, and thus a very large parasitic capacitance may be formed between the second electrode of the light emitting element layer EML and the driving electrode TE or sensing electrode RE of the touch sensing unit TDU. Therefore, forming the driving electrodes TE and the sensing electrodes RE as a mesh-shaped electrode may have reduced parasitic capacitance as compared to forming the driving electrodes TE and the sensing electrodes RE as a non-pattern electrode of a transparent oxide conductive layer such as an ITO layer or an IZO layer.

A first guard line GL1 may be disposed outside the sensing line RL disposed at the outermost of the sensing lines RL. A first ground line GRL1 may be disposed outside the first guard line GL1. In other words, the first guard line GL1 may be disposed at the right side of the sensing line RL located at the right end of the sensing lines RL, and the first ground line GRL1 may be disposed at the right side of the first guard line GL1.

A second guard line GL2 is disposed between the sensing line RL disposed at the innermost of the sensing lines RL and the first driving line TL1 disposed at the right end of the first driving lines TL1. The second guard line GL2 may be disposed between the first driving line TL1 disposed at the right end of the first driving lines TL1 and a second ground line GRL2. A third guard line GL3 may be disposed between the sensing line RL disposed at the innermost of the sensing lines RL and the second ground line GRL2. The second ground line GRL2 may be connected to the leftmost touch pad of the first pad area PDA1 and the rightmost touch pad of the second pad area PDA2.

A fourth guard line GL4 may be disposed outside the second driving line TL2 disposed at the outermost of the second driving lines TL2. A third ground line GRL3 may be disposed outside the fourth guard line GL4. In other words, the fourth guard line GL4 may be disposed at the left and upper sides of the second driving line TL2 disposed on the left and upper ends of the second driving lines TL2, and the third ground line GRL3 may be disposed at the left and upper sides of the fourth guard line GL4.

A fifth guard line GL5 may be disposed inside the second driving line TL2 disposed at the innermost of the second driving lines TL2. In other words, the fifth guard line GL5 may be disposed between the second driving line TL2 disposed at the right end of the second driving lines TL2 and the touch electrodes TE and RE.

According to the exemplary embodiment with reference to FIG. 5, the first ground line GRL1, the second ground line GRL2, and the third ground line GRL3 are respectively disposed at the outermost positions on the upper side, left side, and right side of the display panel 100. A ground voltage is applied to the first ground line GRL1, the second ground line GRL2, and the third ground line GRL3. Thus, when static electricity is applied from the outside, the static electricity may be discharged to the first ground line GRL1, the second ground line GRL2, and the third ground line GRL3.

Further, according to the exemplary embodiment with reference to FIG. 5, since the first guard line GL1 is disposed between the outermost sensing line RL and the first ground line GRL1, the first guard line GL1 may serve to minimize the influence of a voltage change of the first ground line GRL1 on the outermost sensing line RL. The second guard line GL2 is disposed between the innermost sensing line RL and the outermost first driving line TL1. Thus, the second guard line GL2 may serve to minimize the influence of a voltage change on the innermost sensing line RL and the outermost first driving line TL1. Since the third guard line GL3 is disposed between the innermost sensing line RL and the second ground line GRL2, the third guard line GL3 may serve to minimize the influence of a voltage change of the second ground line GRL2 on the innermost sensing line RL. Since the fourth guard line GL4 is disposed between the outermost second driving line TL2 and the third ground line GRL3, the fourth guard line GL4 may serve to minimize the influence of a voltage change of the third ground line GRL3 on the outermost second driving line TL2. Since the fifth guard line GL5 is disposed between the innermost second driving line TL2 and the touch electrodes TE and RE, the fourth guard line GL4 may serve to minimize the influence of the innermost second driving line TL2 and the touch electrodes TE and RE on each other.

When the touch electrodes TE and RE are driven by a mutual capacitance method, a ground voltage may be applied to the first guard line GL1, the second guard line GL2, the third guard line GL3, the fourth guard line GL4, and the fifth guard line GL5. When the touch electrodes TE and RE are driven by a self-capacitance method, the same driving signals as the driving signals applied to the first driving lines TL1, the second driving lines TL2, and the sensing lines RL may be applied to the first guard line GL1, the second guard line GL2, the third guard line GL3, the fourth guard line GL4, and the fifth guard line GL5.

Referring to FIG. 6, in exemplary embodiments of the inventive concept, a touch sensing unit TDU_1 may have a single routing structure. For example, the sensing electrodes RE may be connected to the sensing lines RL disposed at the left and right sides of the touch sensing area TSA. For example, the sensing electrodes RE electrically connected in the first direction (X-axis direction) may be alternately connected to the sensing lines RL disposed at the right and left sides in the second direction (Y-axis direction), the sensing line RL disposed at the left side may be connected to the touch pads TP arranged in the second pad area PDA2, and the sensing line RL disposed at the right side may be connected to the touch pads TP arranged in the first pad area PDA1. However, the inventive concept is not limited thereto. In exemplary embodiments of the inventive concept, the sensing electrodes RE adjacent to the pad areas PDA1 and PDA2 in the second direction (Y-axis direction) may be respectively connected to the sensing lines RL disposed at the left side to be connected to the touch pads TP arranged in the second pad area PDA2, and the sensing electrodes RE in the area relatively far from the pad areas PDA1 and PDA2 in the second direction (Y-axis direction) may be respectively connected to the sensing lines RL disposed at the right side to be connected to the touch pads TP arranged in the first pad area PDA1.

The driving electrode TE disposed at the lower end of the driving electrodes TE, electrically connected in the second direction (Y-axis direction) in the touch sensing area TSA, may be respectively connected to the driving lines TL to be connected to the touch pads TP arranged in the second pad area PDA2.

Figure 7:
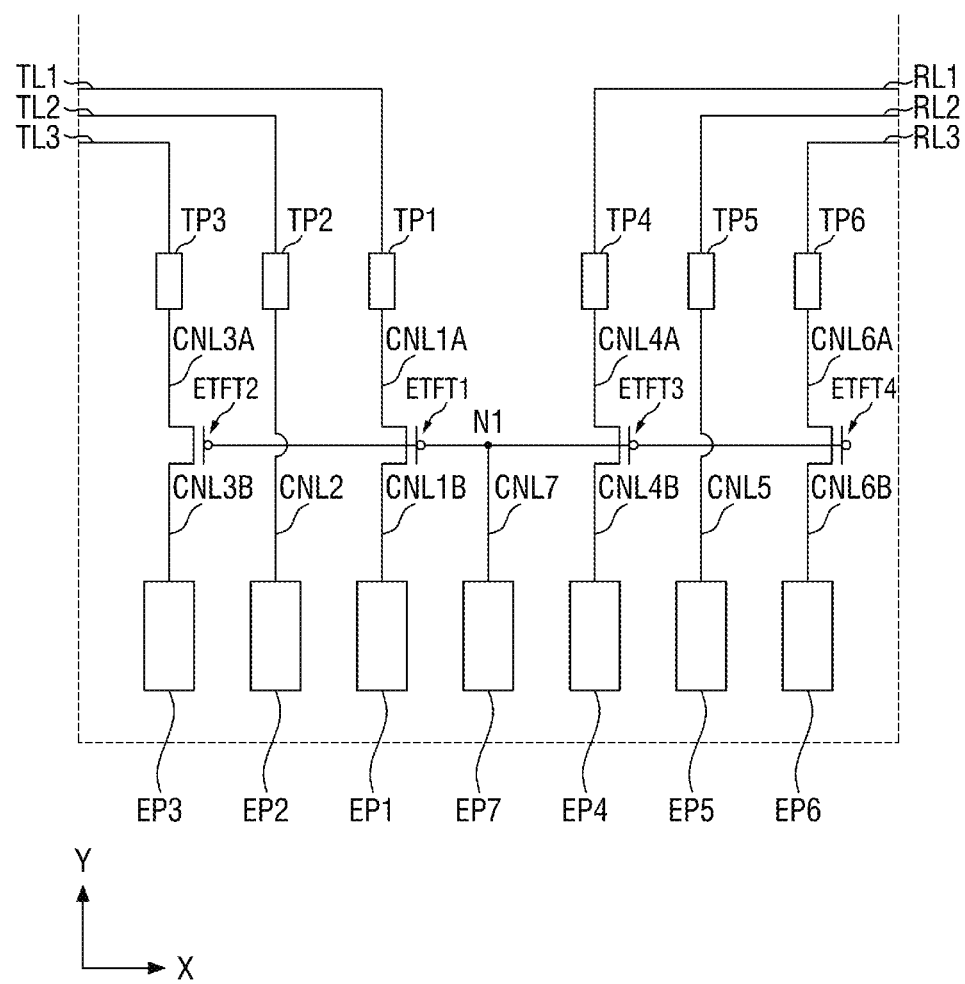
FIG. 7 is a schematic view illustrating a connection relationship of touch pads and inspection pads according to an exemplary embodiment of the inventive concept.
Figure 8:
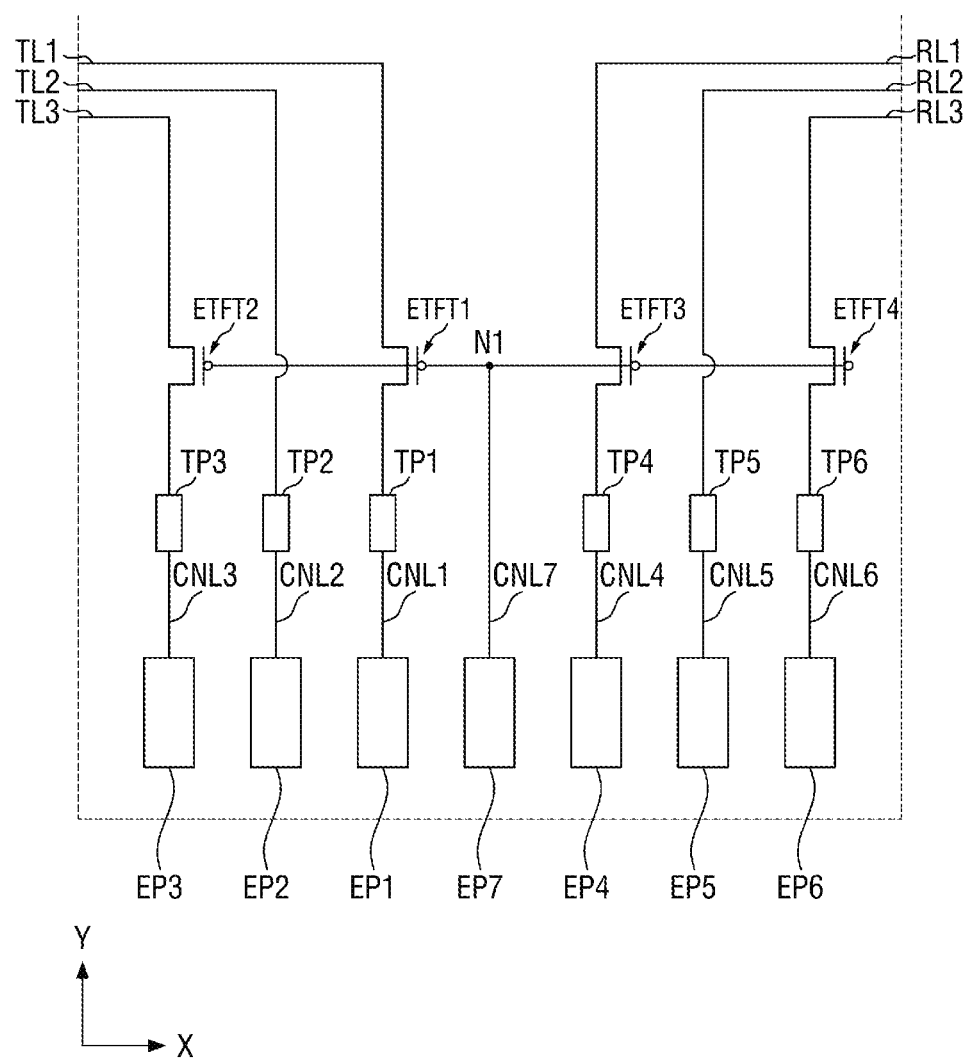
FIG. 8 is a schematic view illustrating a connection relationship of touch pads and inspection pads according to an exemplary embodiment of the inventive concept.

FIG. 7 is a schematic view illustrating a connection relationship of touch pads and inspection pads according to an exemplary embodiment of the inventive concept, and FIG. 8 is a schematic view illustrating a connection relationship of touch pads and inspection pads according to an exemplary embodiment of the inventive concept. For convenience of explanation, FIGS. 7 and 8 show only first to sixth touch pads TP1, TP2, TP3, TP4, TP5, and TP6 connected to first to third driving lines TL1, TL2, and TL3 and first to third sensing lines RL1, RL2, and RL3, but this configuration is only an example, and the inventive concept is not limited thereto.

Referring to FIGS. 7 and 5 together, the pad areas PDA1 and PDA2 of the touch sensing unit TDU may include the first to third driving lines TL1, TL2, and TL3, the first to third sensing lines RL1, RL2, and RL3, the first to sixth touch pads TP1, TP2, TP3, TP4, TP5, and TP6, first to fourth inspection thin film transistors ETFT1, ETFT2, ETFT3, and ETFT4, and first to seventh inspection pads EP1, EP2, EP3, EP4, EP5, EP6, and EP7.

The first to third driving lines TL1, TL2 and TL3 may be sequentially arranged in a direction opposite to the first direction (X-axis direction) with respect to the seventh inspection pad EP7, and the first to third sensing lines RL1, RL2, and RL3 may be sequentially arranged in the first direction (X-axis direction) with respect to the seventh inspection pad EP7. The first to third touch pads TP1, TP2, and TP3 may be sequentially arranged in a direction opposite to the first direction (X-axis direction) with respect to the seventh inspection pad EP7, and the fourth to sixth touch pads TP4, TP5, and TP6 may be sequentially arranged in the first direction (X-axis direction) with respect to the seventh inspection pad EP7. The first to third inspection pads EP1, EP2, and EP3 may be sequentially arranged in a direction opposite to the first direction (X-axis direction) with respect to the seventh inspection pad EP7, and the fourth to sixth inspection pads EP4, EP5, and EP6 may be sequentially arranged in the first direction (X-axis direction) with respect to the seventh inspection pad EP7.

The first driving line TL1 may be connected to the first touch pad TP1. For example, one end of the first driving line TL1 may be connected to the first touch pad TP1, and the other end of the first driving line TL1 may be connected to the driving electrodes TE of a first column. A 1_1th connection line CNL1A, a 1_2th connection line CNL1B, and the first inspection thin film transistor ETFT1 may be arranged between the first touch pad TP1 and the first inspection pad EP1. The first inspection thin film transistor ETFT1 may be an n-type transistor or a p-type transistor. Hereinafter, a case where the inspection thin film transistors ETFT1, ETFT2, ETFT3, and ETFT4 are p-type transistors will be described as an example, but the inventive concept is not limited thereto.

One end of the 1_1th connection line CNL1A may be connected to the first touch pad TP1, the other end of the 1_1th connection line CNL1A may be connected to the first electrode (source or drain electrode) of the first inspection thin film transistor ETFT1, one end of the 1_2th connection line CNL1B may be connected to the second electrode (source or drain electrode) of the first inspection thin film transistor ETFT1, and the other end of the 1_2th connection line CNL1B may be connected to the first inspection pad EP1. The control electrode (gate electrode) of the first inspection thin film transistor ETFT1 may be connected to a first node N1.

The second driving line TL2 may be connected to the second touch pad TP2. For example, one end of the second driving line TL2 may be connected to the second touch pad TP2, and the other end of the second driving line TL2 may be connected to the driving electrodes TE of a second column. A second connection line CNL2 may be disposed between the second touch pad TP2 and the second inspection pad EP2. One end of the second connection line CNL2 may be connected to the second touch pad TP2, and the other end of the second connection line CNL2 may be connected to the second inspection pad EP2.

The third driving line TL3 may be connected to the third touch pad TP3. For example, one end of the third driving line TL3 may be connected to the third touch pad TP3, and the other end of the third driving line TL3 may be connected to the driving electrodes TE of a third column. A 3_1th connection line CNL3A, a 3_2th connection line CNL3B, and the second inspection thin film transistor ETFT2 may be arranged between the first touch pad TP1 and the third inspection pad EP3. One end of the 3_1th connection line CNL3A may be connected to the third touch pad TP3, the other end of the 3_1th connection line CNL3A may be connected to the first electrode (source or drain electrode) of the second inspection thin film transistor ETFT2, one end of the 3_2th connection line CNL3B may be connected to the second electrode (source or drain electrode) of the second inspection thin film transistor ETFT2, and the other end of the 3_2th connection line CNL3B may be connected to the third inspection pad EP3. The control electrode (gate electrode) of the second inspection thin film transistor ETFT2 may be connected to the first node N1.

The first sensing line RL1 may be connected to the fourth touch pad TP4. For example, one end of the first sensing line RL1 may be connected to the fourth touch pad TP4, and the other end of the first sensing line RL1 may be connected to the sensing electrodes RE of a first row. A 4_1th connection line CNL4A, a 4_2th connection line CNL4B, and the third inspection thin film transistor ETFT3 may be arranged between the fourth touch pad TP4 and the fourth inspection pad EP4. One end of the 4_1th connection line CNL4A may be connected to the fourth touch pad TP4, the other end of the 4_1th connection line CNL4A may be connected to the first electrode (source or drain electrode) of the third inspection thin film transistor ETFT3, one end of the 4_2th connection line CNL4B may be connected to the second electrode (source or drain electrode) of the third inspection thin film transistor ETFT3, and the other end of the 4_2th connection line CNL4B may be connected to the fourth inspection pad EP4. The control electrode (gate electrode) of the third inspection thin film transistor ETFT3 may be connected to the first node N1.

The second sensing line RL2 may be connected to the fifth touch pad TP5. For example, one end of the second sensing line RL2 may be connected to the fifth touch pad TP5, and the other end of the second sensing line RL2 may be connected to the sensing electrodes RE of a second row. A fifth connection line CNL5 may be arranged between the fifth touch pad TP5 and the fifth inspection pad EP5. One end of the fifth connection line CNL5 may be connected to the fifth touch pad TP5, and the other end of the fifth connection line CNL5 may be connected to the fifth inspection pad EP5.

The third sensing line RL3 may be connected to the sixth touch pad TP6. For example, one end of the third sensing line RL3 may be connected to the sixth touch pad TP6, and the other end of the third sensing line RL3 may be connected to the sensing electrodes RE of the third row. A 6_1th connection line CNL6A, a 6_2th connection line CNL6B, and the fourth inspection thin film transistor ETFT4 may be arranged between the sixth touch pad TP6 and the sixth inspection pad EP6. One end of the 6_1th connection line CNL6A may be connected to the sixth touch pad TP6, the other end of the 6_1th connection line CNL6A may be connected to the first electrode (source or drain electrode) of the fourth inspection thin film transistor ETFT4, one end of the 6_2th connection line CNL6B may be connected to the second electrode (source or drain electrode) of the fourth inspection thin film transistor ETFT4, and the other end of the 6_2th connection line CNL6B may be connected to the sixth inspection pad EP6. The control electrode (gate electrode) of the fourth inspection thin film transistor ETFT4 may be connected to the first node N1.

The seventh inspection pad EP7 may be connected to the first node N1. For example, the seventh inspection pad EP7 may be connected to the first node N1 through a seventh connection line CNL7.

Referring to FIG. 8, in exemplary embodiments of the inventive concept, the first driving line TL1 may be directly connected to the first inspection thin film transistor ETFT1. For example, one end of the first driving line TL1 may be connected to the first electrode (source or drain electrode) of the first inspection thin film transistor ETFT1, and the other end of the first driving line TL1 may be connected to the driving electrodes TE of the first column. The second electrode (drain or source electrode) of the first inspection thin film transistor ETFT1 may be connected to the first touch pad TP1, the control electrode (gate electrode) of the first inspection thin film transistor ETFT1 may be connected to the first node N1, and the first touch pad TP1 may be connected to the first inspection pad EP1 through a first connection line CNL1.

The second driving line TL2 may be electrically connected to the second touch pad TP2. For example, one end of the second driving line TL2 may be connected to the second touch pad TP2, and the other end of the second driving line TL2 may be connected to the driving electrodes TE of the second column. The second touch pad TP2 may be connected to the second inspection pad EP2 through the second connection line CNL2.

The third driving line TL3 may be directly connected to the second inspection thin film transistor ETFT2. For example, one end of the third driving line TL3 may be connected to the first electrode (source or drain electrode) of the second inspection thin film transistor ETFT2, and the other end of the third driving line TL3 may be connected to the driving electrodes TE of the third column. The second electrode (drain or source) of the second inspection thin film transistor TFT2 may be connected to the third touch pad TP3, the control electrode (gate electrode) of the second inspection thin film transistor ETFT2 may be connected to the first node N1, and the third touch pad TP3 may be connected to the third inspection pad EP3 through a third connection line CNL3.

The first sensing line RL1 may be directly connected to the third inspection thin film transistor ETFT3. For example, one end of the first sensing line RL1 may be connected to the first electrode (source or drain electrode) of the third inspection thin film transistor ETFT3, and the other end of the first sensing line RL1 may be connected to the sensing electrodes RE of the first row. The second electrode (drain or source) of the third inspection thin film transistor TFT3 may be connected to the fourth touch pad TP4, the control electrode (gate electrode) of the third inspection thin film transistor ETFT3 may be connected to the first node N1, and the fourth touch pad TP4 may be connected to the fourth inspection pad EP4 through a fourth connection line CNL4.

The second sensing line RL2 may be electrically connected to the fifth touch pad TP5. For example, one end of the second sensing line RL2 may be connected to the fifth touch pad TP5, and the other end of the second driving line TL2 may be connected to the sensing electrodes RE of the second row. The fifth touch pad TP5 may be connected to the fifth inspection pad EP5 through the fifth connection line CNL5.

The third sensing line RL3 may be directly connected to the fourth inspection thin film transistor ETFT4. For example, one end of the third sensing line RL3 may be connected to the first electrode (source or drain electrode) of the fourth inspection thin film transistor ETFT4, and the other end of the third sensing line RL3 may be connected to the sensing electrodes RE of the third row. The second electrode (drain or source) of the fourth inspection thin film transistor TFT4 may be connected to the sixth touch pad TP6, the control electrode (gate electrode) of the fourth inspection thin film transistor ETFT4 may be connected to the first node N1, and the sixth touch pad TP6 may be connected to the sixth inspection pad EP6 through a sixth connection line CNL6.

The arrangement structure of the first to third driving lines TL1, TL2 and TL3, the first to third sensing lines RL1, RL2 and RL3, the first to sixth touch pads TP1 to TP6, the first to fourth inspection thin film transistors ETFT1, ETFT2, ETFT3, and ETFT4, and the first to seventh inspection pads EP1, EP2, EP3, EP4, EP5, EP6, and EP7 is only an example, and the inventive concept is not limited thereto.

Figure 9:
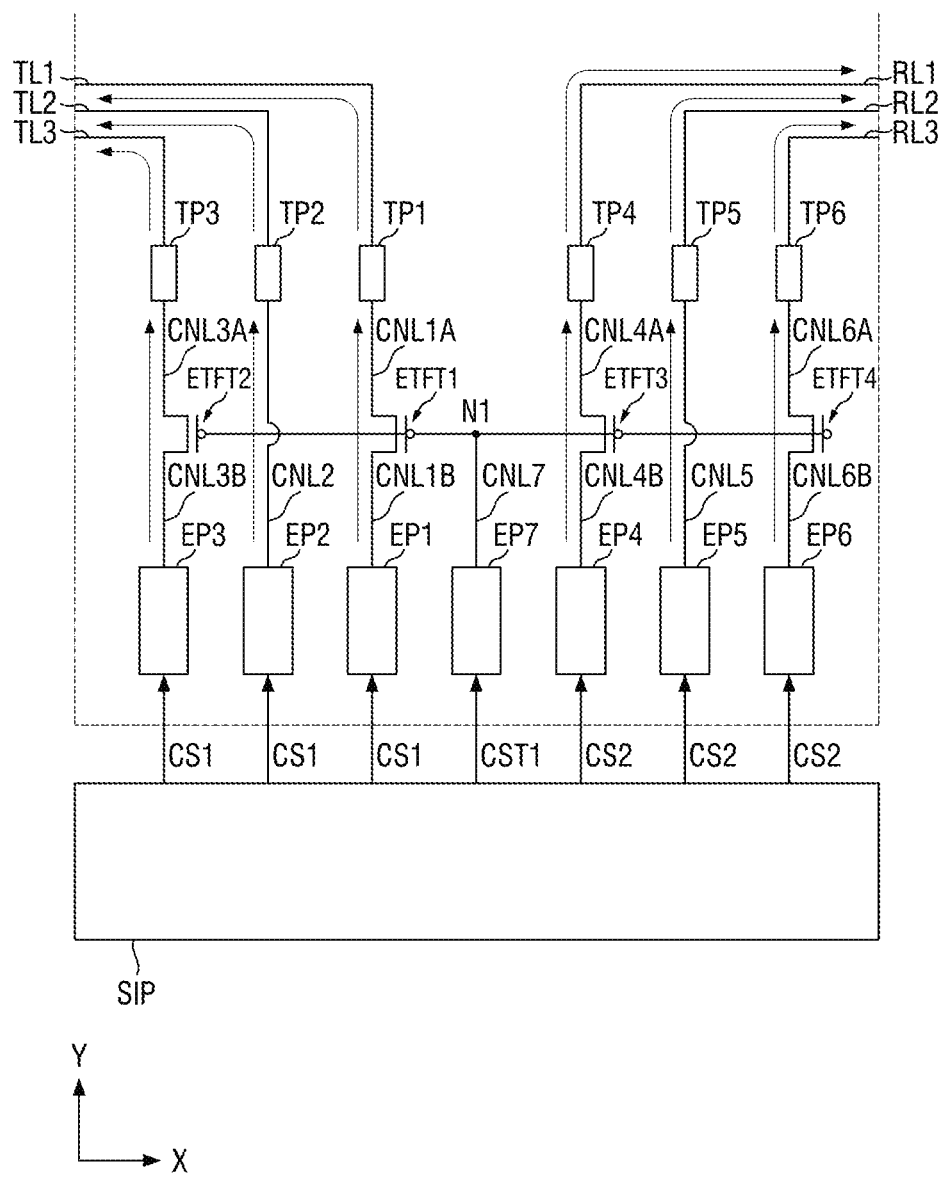
FIG. 9 is a schematic view illustrating a state where first aging proceeds according to an exemplary embodiment of the inventive concept.
Figure 10:
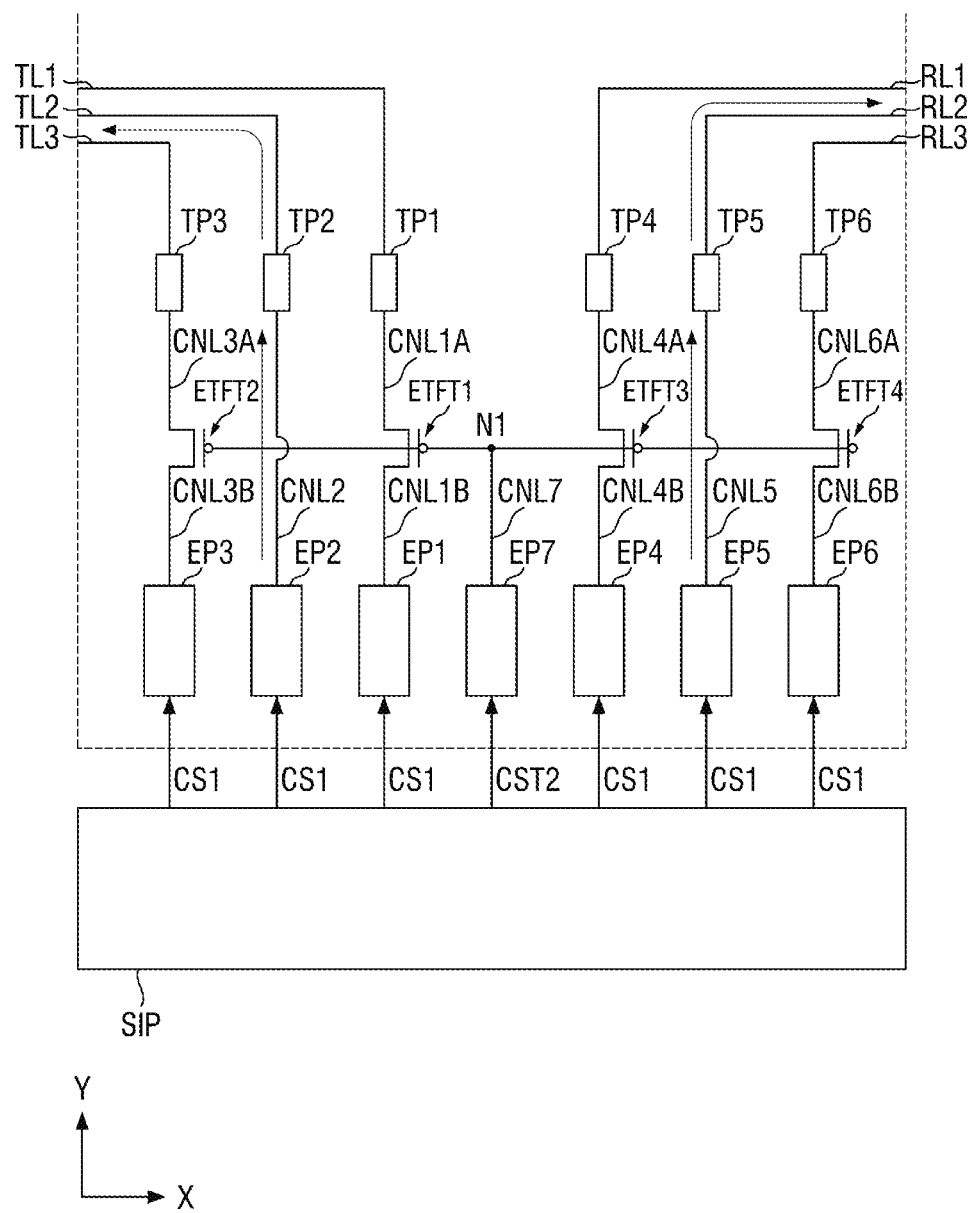
FIG. 10 is a schematic view illustrating a state where second aging proceeds according to an exemplary embodiment of the inventive concept.
Figure 11:
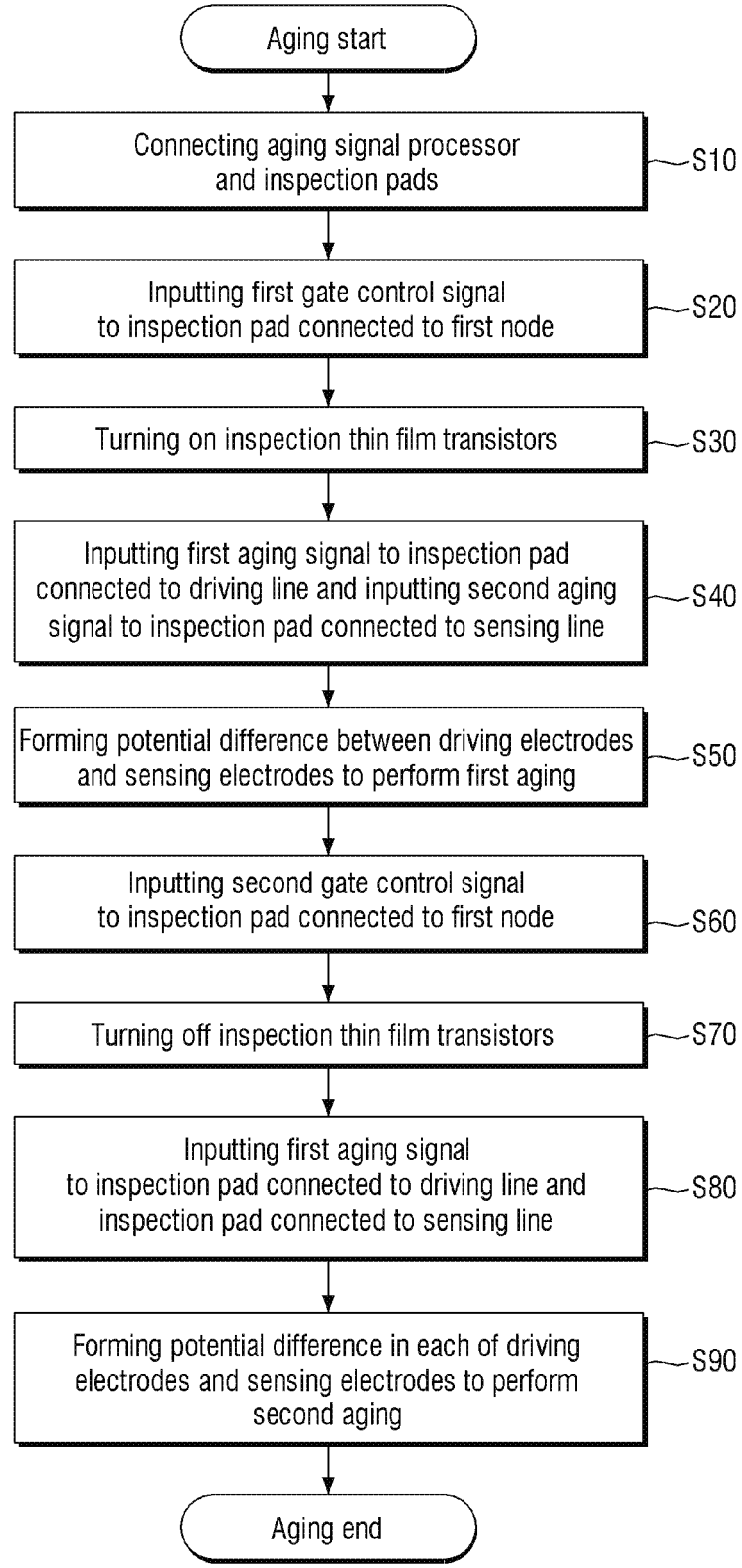
FIG. 11 is a flowchart illustrating a process in which first aging and second aging proceeds according to an exemplary embodiment of the inventive concept.

FIG. 9 is a schematic view illustrating a state where first aging proceeds according to an exemplary embodiment of the inventive concept, FIG. 10 is a schematic view illustrating a state where second aging proceeds according to an exemplary embodiment of the inventive concept, and FIG. 11 is a flowchart illustrating a process in which first aging and second aging proceeds according to an exemplary embodiment of the inventive concept.

Referring to FIGS. 9 to 11, aging signals CS1 and CS2 may be applied to the first to sixth inspection pads EP1, EP2, EP3, EP4, EP5, and EP6 of the touch sensing unit TDU, and gate control signals CST1 and CST2 may be applied to the seventh inspection pad EP7.

The aging signals CS1 and CS2 and the gate control signals CST1 and CST2 may be supplied from an aging signal processor SIP, and the aging signals CS1 and CS2 may be AC pulse signals. For example, each of the AC pulse signals may be selected to have a voltage level of about −25 V to about 25 V. However, the inventive concept is not limited thereto, and the aging signals CS1 and CS2 may be DC signals.

In exemplary embodiments of the inventive concept, the aging signals CS1 and CS2 may include a first aging signal CS1 and a second aging signal CS2. The first aging signal CS1 may have a voltage level of about 25 V, and the second aging signal CS2 may have a voltage level of about −25 V.

The gate control signals CST1 and CST2 may include a first gate control signal CST1 and a second gate control signal CST2. The first gate control signal CST1 may be a gate-on signal, and the first to fourth inspection thin film transistors ETFT1, ETFT2, ETFT3, and ETFT4 may be turned on by the first gate control signal CST1. The second gate control signal CST2 may be a gate-off signal, and the first to fourth inspection thin film transistors ETFT1, ETFT2, ETFT3, and ETFT4 may be turned off by the second gate control signal CST2.

Explaining a first aging method with reference to FIGS. 9 and 11, the aging signal processor SIP is connected to the touch sensing unit TDU (S10). For example, a flexible printed circuit for inspection may be disposed in the aging signal processor SIP, and the pad portion of the flexible printed circuit for inspection may be connected to the inspection pads EP1, EP2, EP3, EP4, EP5, EP6, and EP7 of the touch sensing unit TDU.

Next, the first gate control signal CST1 is input to the seventh inspection pad EP7 connected to the first node N1 (S20). For example, a gate-on voltage may be applied from the aging signal processor SIP to the seventh inspection pad EP7.

When the gate-on voltage is applied to the seventh inspection pad EP7, the first to fourth inspection thin film transistors ETFT1, ETFT2, ETFT3 and ETFT4 connected to the first node N1 are turned on (S30).

Next, the first aging signal CS1 is input to the inspection pads EP connected to the driving lines TL, and the second aging signal CS2 is input to the inspection pads EP connected to the sensing lines RL (S40). For example, the first aging signal CS1 is applied to the first to third inspection pads EP1, EP2, and EP3 connected to the first to third driving lines TL1, TL2, and TL3, and the second aging signal CS2 is applied to the fourth to sixth inspection pads EP4, EP5, and EP6 connected to the first to third sensing lines RL1, RL2, and RL3. As described above, the first aging signal CS1 may have a voltage level of about 25 V, and the second aging signal CS2 may have a voltage level of about −25 V.

Thus, a potential difference of about 50 V is generated between the driving electrodes TE connected to the driving lines TL and the sensing electrodes RE connected to the sensing line RL, so that first aging proceeds between the driving electrodes TE and the sensing electrodes RE (S50). Through the first aging, a short due to foreign matter may be prevented between the driving electrodes TE and the sensing electrodes RE.

Explaining a second aging method with reference to FIGS. 10 and 11, the second gate control signal CST2 is input to the seventh inspection pad EP7 connected to the first node N1 (S60). For example, a gate-off voltage may be applied from the aging signal processor SIP to the seventh inspection pad EP7.

When the gate-off voltage is applied to the seventh inspection pad EP7, the first to fourth inspection thin film transistors ETFT1, ETFT2, ETFT3 and ETFT4 connected to the first node N1 are turned off (S70).

Next, the first aging signal CS1 is input to each of the inspection pads EP connected to the driving lines TL and the inspection pads EP connected to the sensing lines RL (S80). For example, the first aging signal CS1 is applied to the first to third inspection pads EP1, EP2, and EP3 connected to the first to third driving lines TL1, TL2, and TL3 and the fourth to sixth inspection pads EP4, EP5, and EP6 connected to the first to third sensing lines RL1, RL2, and RL3. However, the inventive concept is not limited thereto. In exemplary embodiments of the inventive concept, the second aging signal CS2 may also be applied to the first to third inspection pads EP1, EP2, and EP3 connected to the first to third driving lines TL1, TL2, and TL3 and the fourth to sixth inspection pads EP4, EP5, and EP6 connected to the first to third sensing lines RL1, RL2, and RL3.

When the first to fourth inspection thin film transistors ETFT1, ETFT2, ETFT3, and ETFT4 are turned off, the first aging signal CS1 is not applied to the first driving line TL1, the third driving line TL3, the first sensing line RL1, and the third sensing line RL3, and the first aging signal CS1 is applied to the second driving line TL2 and the second sensing line RL2. Thus, a voltage difference is generated between the first to third driving lines TL1, TL2, and TL3, and a voltage difference is generated between the first to third sensing lines RL1, RL2, and RL3, so that the second aging for the driving lines TL and the sensing lines RL proceeds (S90). Through the second aging, a short due to foreign matter may be prevented between the driving electrodes TE and the sensing electrodes RE.

Although it is shown in FIG. 11 that the first aging is performed and then the second aging is performed, the inventive concept is not limited thereto. In exemplary embodiments of the inventive concept, the second aging may be performed and then the first aging may be performed. Further, in exemplary embodiments of the inventive concept, the first aging and the second aging may each be performed in separate process steps.

Figure 12:
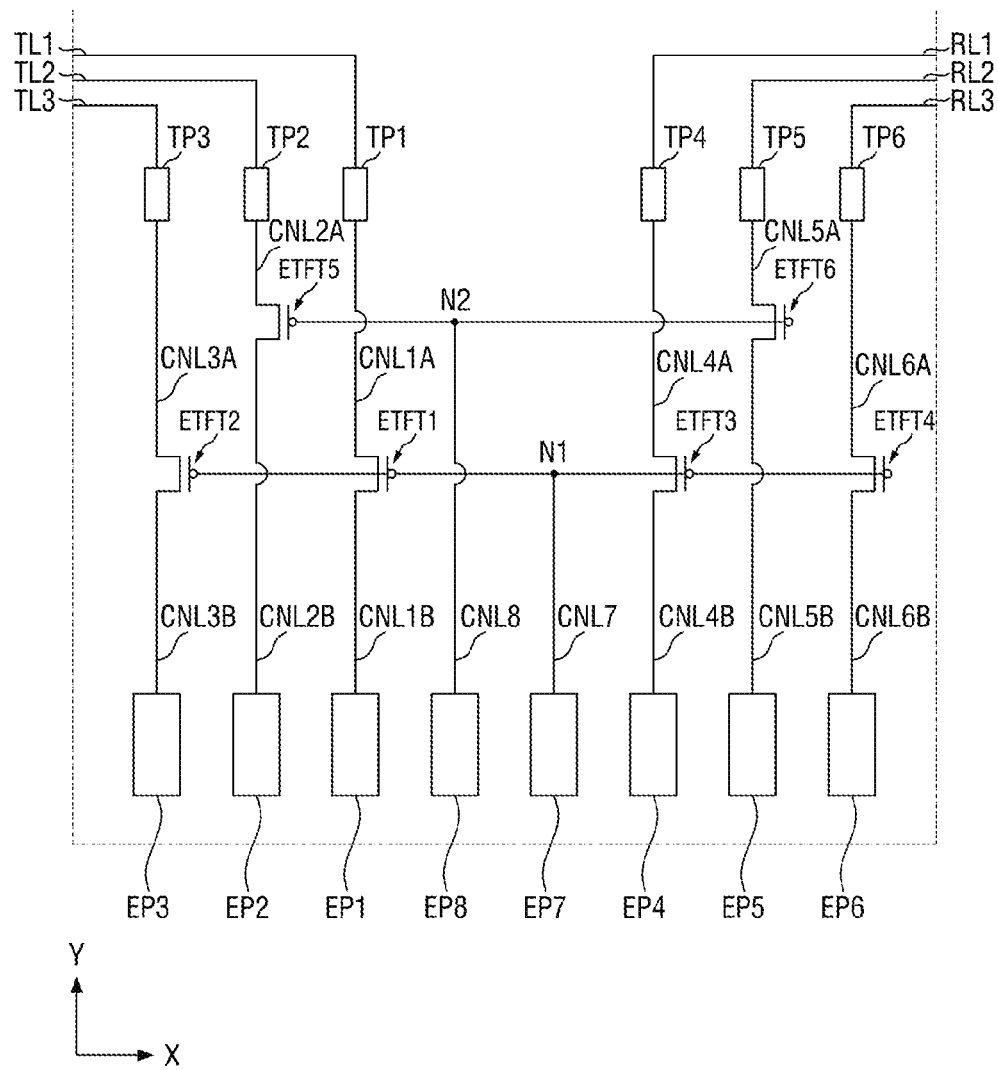
FIG. 12 is a schematic view illustrating a connection relationship of touch pads and inspection pads according to an exemplary embodiment of the inventive concept.
Figure 13:
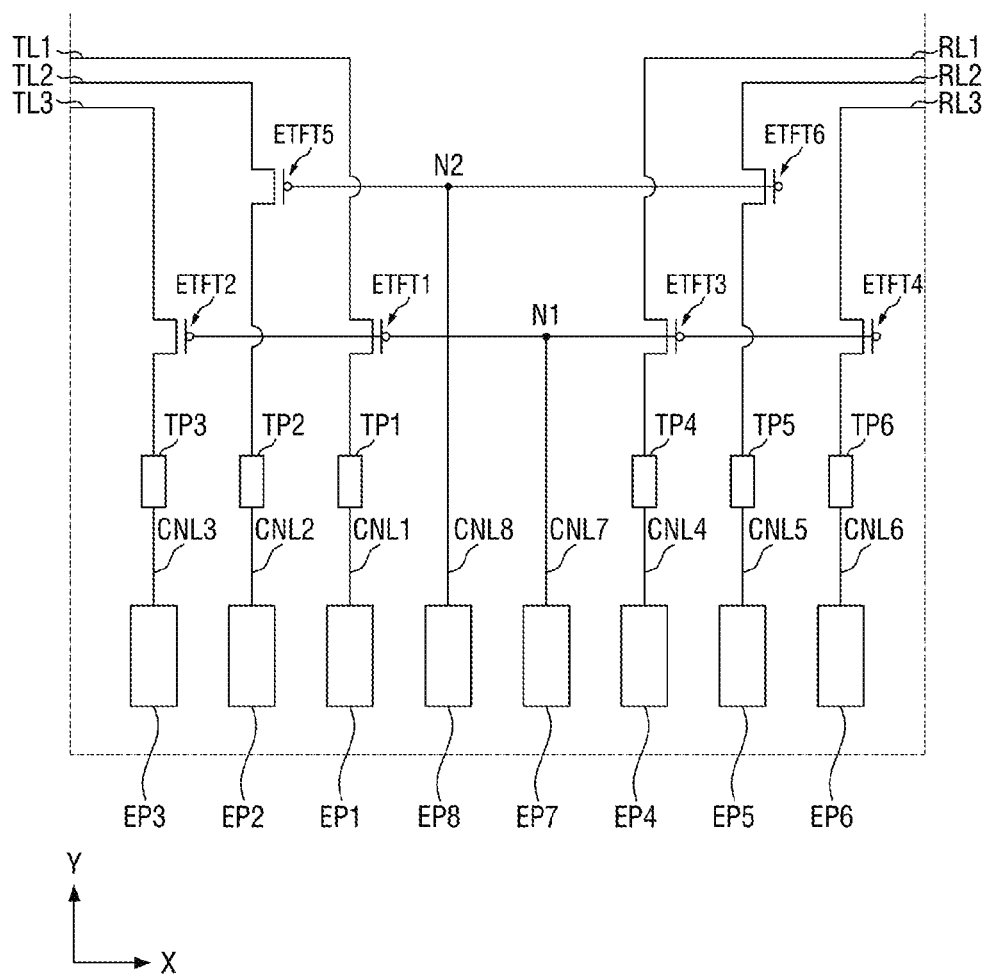
FIG. 13 is a schematic view illustrating a connection relationship of touch pads and inspection pads according to an exemplary embodiment of the inventive concept.

FIG. 12 is a schematic view illustrating a connection relationship of touch pads and inspection pads according to an exemplary embodiment of the inventive concept, and FIG. 13 is a schematic view illustrating a connection relationship of touch pads and inspection pads according to an exemplary embodiment of the inventive concept. The exemplary embodiments of FIGS. 12 and 13 are different from the aforementioned exemplary embodiments of FIGS. 7 and 8 in that a fifth inspection thin film transistor ETFT5, a sixth inspection thin film transistor ETFT6, and an eighth inspection pad EP8 connected thereto are further provided. Hereinafter, a description of the connection relationship of the first and third driving lines TL1 and TL3, the first and third sensing lines RL1 and RL3, and the first, third, fourth, sixth, and seventh inspection pads EP1, EP3, EP4, EP6, and EP7, overlapping that of the exemplary embodiments of FIGS. 7 and 8, will be omitted, and differences such as the second driving line TL2, the second sensing line RL2, and the second, fifth, and eighth inspection pads EP2, EP5, and EP8 will be mainly described.

The second driving line TL2 may be connected to the second touch pad TP2. A 2_1th connection line CNL2A, a 2_2th connection line CNL2B, and the fifth inspection thin film transistor ETFT5 may be arranged between the second touch pad TP2 and the second inspection pad EP2. One end of the 2_1th connection line CNL2A may be connected to the second touch pad TP2, and the other end of the 2_1th connection line CNL2A may be connected to the first electrode (source or drain electrode) of the fifth inspection thin film transistor ETFT5. One end of the 2_2th connection line CNL2B may be connected to the second electrode (drain or source electrode) of the fifth inspection thin film transistor ETFT5, and the other end of the 2_2th connection line CNL2B may be connected to the second inspection pad EP2. The control electrode (gate electrode) of the fifth inspection thin film transistor ETFT5 may be connected to a second node N2.

The second sensing line RL2 may be connected to the fifth touch pad TP5. A 5_1th connection line CNL5A, a 5_2th connection line CNL5B, and the sixth inspection thin film transistor ETFT6 may be arranged between the fifth touch pad TP5 and the fifth inspection pad EP5. One end of the 5_1th connection line CNL5A may be connected to the fifth touch pad TP5, and the other end of the 5_1th connection line CNL5A may be connected to the first electrode (source or drain electrode) of the sixth inspection thin film transistor ETFT6. One end of the 5_2th connection line CNL5B may be connected to the second electrode (drain or source electrode) of the sixth inspection thin film transistor ETFT6, and the other end of the 5_2th connection line CNL5B may be connected to the fifth inspection pad EP5. The control electrode (gate electrode) of the sixth inspection thin film transistor ETFT6 may be connected to the second node N2.

The eighth inspection pad EP8 may be connected to the second node N2. For example, the eighth inspection pad EP8 may be connected to the second node N2 through a eighth connection line CNL8.

Referring to FIG. 13, in exemplary embodiments of the inventive concept, the second driving line TL2 may be directly connected to the fifth inspection thin film transistor ETFT5. For example, one end of the second driving line TL2 may be connected to the first electrode (source or drain electrode) of the fifth inspection thin film transistor ETFT5, the second electrode (drain or source electrode) of the fifth inspection thin film transistor ETFT5 may be connected to the second touch pad TP2, the control electrode (gate electrode) of the fifth inspection thin film transistor ETFT5 may be connected to the second node N2, and the second touch pad TP2 may be connected to the second inspection pad EP2 through the second connection line CNL2.

The second sensing line RL2 may be directly connected to the sixth inspection thin film transistor ETFT6. For example, one end of the second sensing line RL2 may be connected to the first electrode (source or drain electrode) of the sixth inspection thin film transistor ETFT6, the second electrode (drain or source electrode) of the sixth inspection thin film transistor ETFT6 may be connected to the fifth touch pad TP5, the control electrode (gate electrode) of the sixth inspection thin film transistor ETFT6 may be connected to the second node N2, and the fifth touch pad TP5 may be connected to the fifth inspection pad EP5 through the fifth connection line CNL5.

As described above, when the inspecting thin film transistors ETFT are disposed on the driving lines TL and the sensing lines RL, it is possible to reduce the noise generated depending on the presence or absence of the inspection thin film transistors ETFT connected to the driving lines TL and the sensing lines RL during aging.

Figure 14:
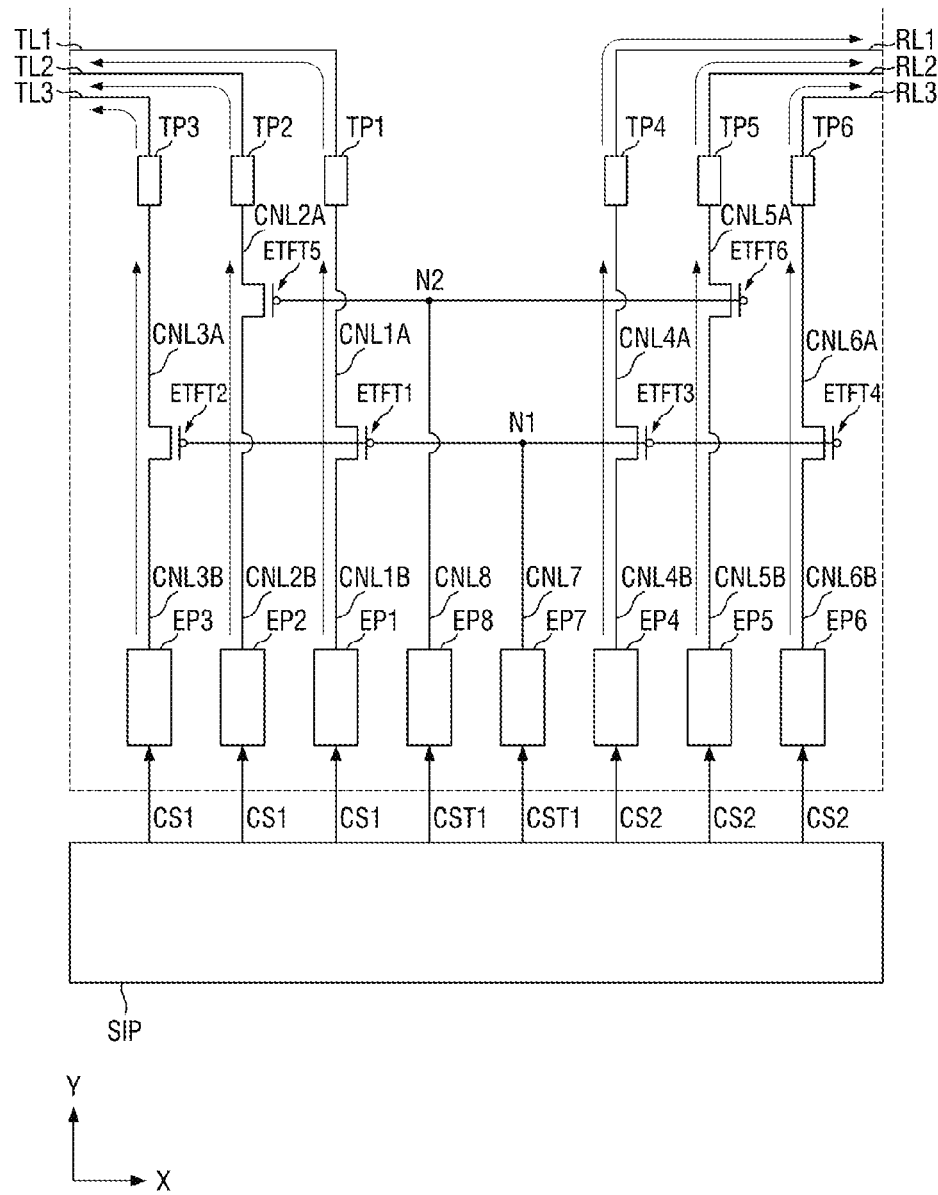
FIG. 14 is a schematic view illustrating a state where first aging proceeds according to an exemplary embodiment of the inventive concept.
Figure 15:
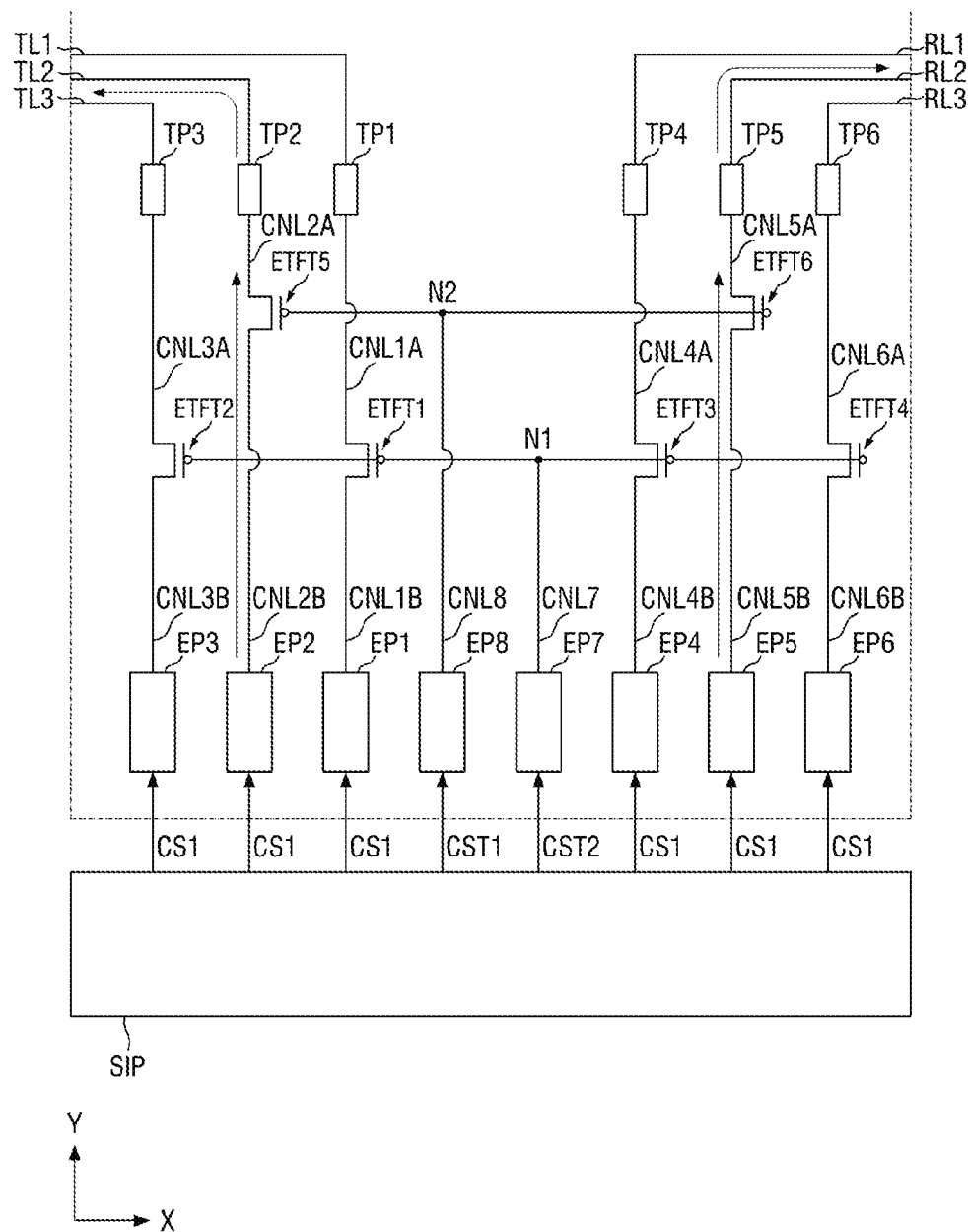
FIG. 15 is a schematic view illustrating a state where second aging proceeds according to an exemplary embodiment of the inventive concept.
Figure 16:
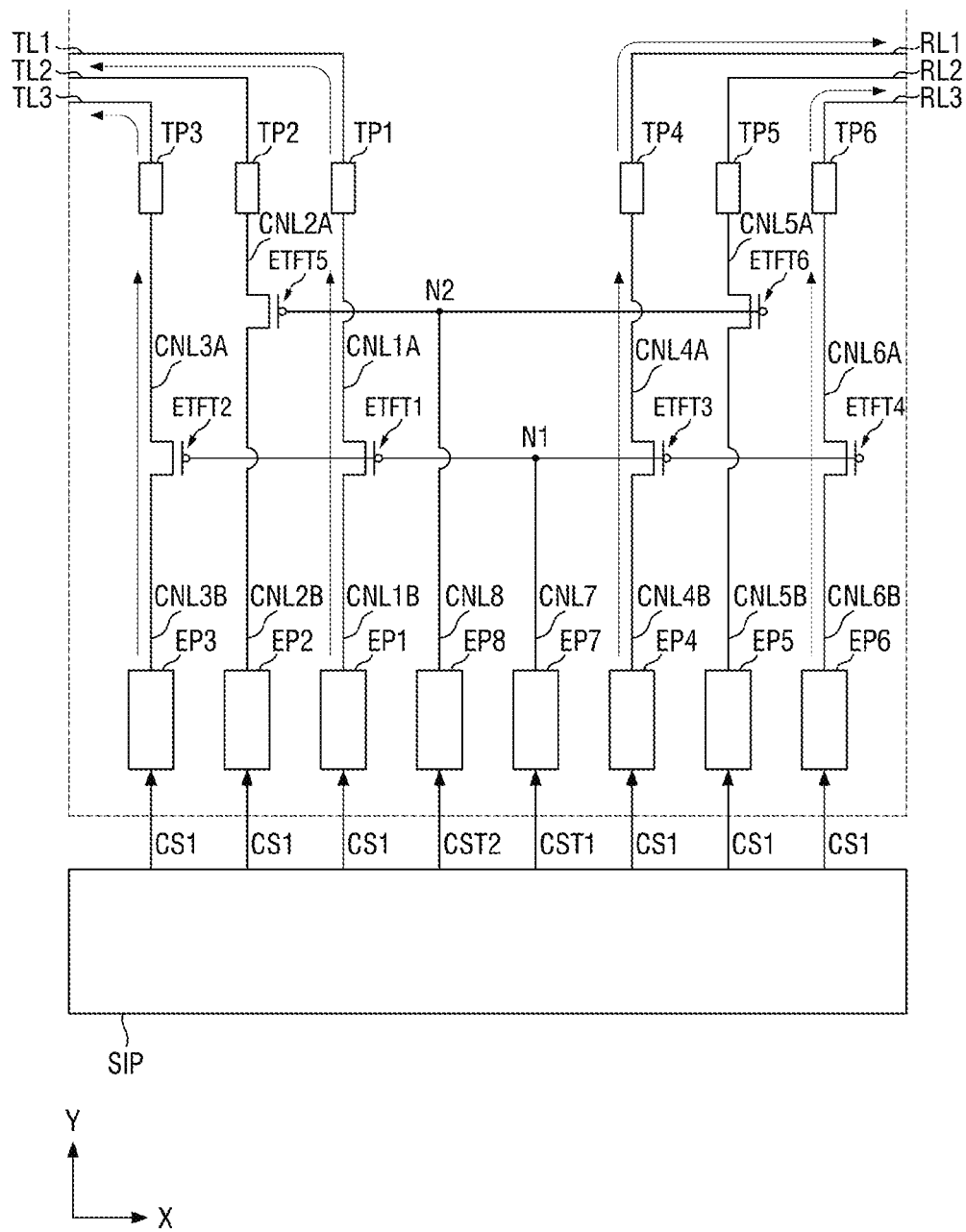
FIG. 16 is a schematic view illustrating a state where second aging proceeds according to an exemplary embodiment of the inventive concept.

FIG. 14 is a schematic view illustrating a state where first aging proceeds according to an exemplary embodiment of the inventive concept, FIG. 15 is a schematic view illustrating a state where second aging proceeds according to an exemplary embodiment of the inventive concept, and FIG. 16 is a schematic view illustrating a state where second aging proceeds according to an exemplary embodiment of the inventive concept. The exemplary embodiments of FIGS. 14 to 16 are different from the aforementioned exemplary embodiments of FIGS. 9 and 10 in that the fifth inspection thin film transistor ETFT5, the sixth inspection thin film transistor ETFT6, and the eighth inspection pad EP8 connected thereto are further provided. Hereinafter, a description overlapping that of the exemplary embodiments of FIGS. 9 and 10 will be omitted, and differences will be mainly described.

Referring to FIGS. 14 to 16, the aging signals CS1 and CS2 may be applied to the first to sixth inspection pads EP1, EP2, EP3, EP4, EP5, and EP6 of the touch sensing unit TDU, and the gate control signals CST1 and CST2 may be applied to the seventh and eighth inspection pads EP7 and EP8.

Referring to FIG. 14, the first gate control signal CST1 may be input to the seventh inspection pad EP7 connected to the first node N1 and the eighth inspection pad EP8 connected to the second node N2. For example, a gate-on voltage may be applied from the aging signal processor SIP to the seventh inspection pad EP7 and the eighth inspection pad EP8. The seventh inspection pad EP7 may be referred to as a first node inspection pad, and the eighth inspection pad EP8 may be referred to as a second node inspection pad.

When the gate-on voltage is applied to the seventh inspection pad EP7 and the eighth inspection pad EP8, the first through sixth inspection thin film transistors ETFT1, ETFT2, ETFT3, ETFT4, ETFT5, and ETFT6 connected to the first node N1 and the second node N2 are turned on.

Next, the first aging signal CS1 is input to the inspection pads EP connected to the driving lines TL, and the second aging signal CS2 is input to the inspection pads EP connected to the sensing lines RL to generate a potential difference between the driving electrodes TE connected to the driving lines TL and the sensing electrodes RE connected to the sensing lines RL, so that first aging may proceed between the driving electrodes TE and the sensing electrodes RE. Through the first aging, a short due to foreign matter may be prevented between the driving electrodes TE and the sensing electrodes RE.

Explaining a second aging method of an exemplary embodiment with reference to FIG. 15, the second gate control signal CST2 is input to the seventh inspection pad EP7 connected to the first node N1, and the first gate control signal CST1 is input to the eighth inspection pad EP8 connected to the second node N2. For example, a gate-off voltage may be applied from the aging signal processor SIP to the seventh inspection pad EP7, and a gate-on voltage may be applied from the aging signal processor SIP to the eighth inspection pad EP8.

When the gate-off voltage is applied to the seventh inspection pad EP7, the first to fourth inspection thin film transistors ETFT1, ETFT2, ETFT3, and ETFT4 connected to the first node N1 are turned off, and the fifth and sixth inspection thin film transistors ETFT5 and ETFT6 connected to the second node N2 are turned on.

When the first aging signal CS1 is input to each of the inspection pads EP connected to the driving lines TL and the inspection pads EP connected to the sensing lines RL, the first aging signal CS1 is not applied to the first driving line TL1, the third driving line TL3, the first sensing line RL1, and the third sensing line RL3, and the first aging signal CS1 is applied to the second driving line TL1 and the second sensing line RL2. Thus, a voltage difference is generated between the first to third driving lines TL1, TL2, and TL3, and a voltage difference is generated between the first to third sensing lines RL1, RL2, and RL3, so that the second aging for the driving lines TL and the sensing lines RL may proceed. Through the second aging, a short due to foreign matter may be prevented between the driving electrodes TE and the sensing electrodes RE.

Explaining a second aging method of an exemplary embodiment with reference to FIG. 16, the first gate control signal CST1 is input to the seventh inspection pad EP7 connected to the first node N1, and the second gate control signal CST2 is input to the eighth inspection pad EP8 connected to the second node N2. For example, a gate-on voltage may be applied from the aging signal processor SIP to the seventh inspection pad EP7, and a gate-off voltage may be applied from the aging signal processor SIP to the eighth inspection pad EP8.

When the gate-on voltage is applied to the seventh inspection pad EP7, the first to fourth inspection thin film transistors ETFT1, ETFT2, ETFT3, and ETFT4 connected to the first node N1 are turned on, and when the gate-off voltage is applied to the eighth inspection pad EP8, the fifth and sixth inspection thin film transistors ETFT5 and ETFT6 connected to the second node N2 are turned off.

When the first aging signal CS1 is input to each of the inspection pads EP connected to the driving lines TL and the inspection pads EP connected to the sensing lines RL, the first aging signal CS1 is applied to the first driving line TL1, the third driving line TL3, the first sensing line RL1, and the third sensing line RL3, and the first aging signal CS1 is not applied to the second driving line TL1 and the second sensing line RL2. Thus, a voltage difference is generated between the first to third driving lines TL1, TL2, and TL3, and a voltage difference is generated between the first to third sensing lines RL1, RL2, and RL3, so that the second aging for the driving lines TL and the sensing lines RL may proceed.

Figure 17:
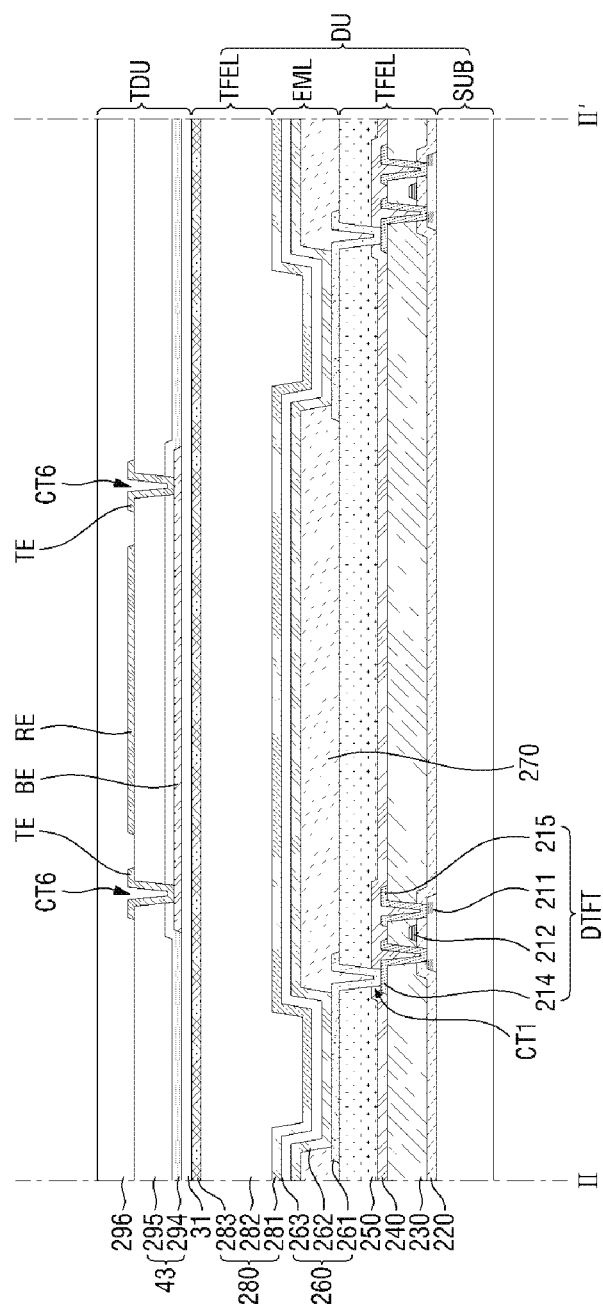
FIG. 17 is a cross-sectional view taken along the line II-II' of FIG. 2 according to an exemplary embodiment of the inventive concept.
Figure 18:
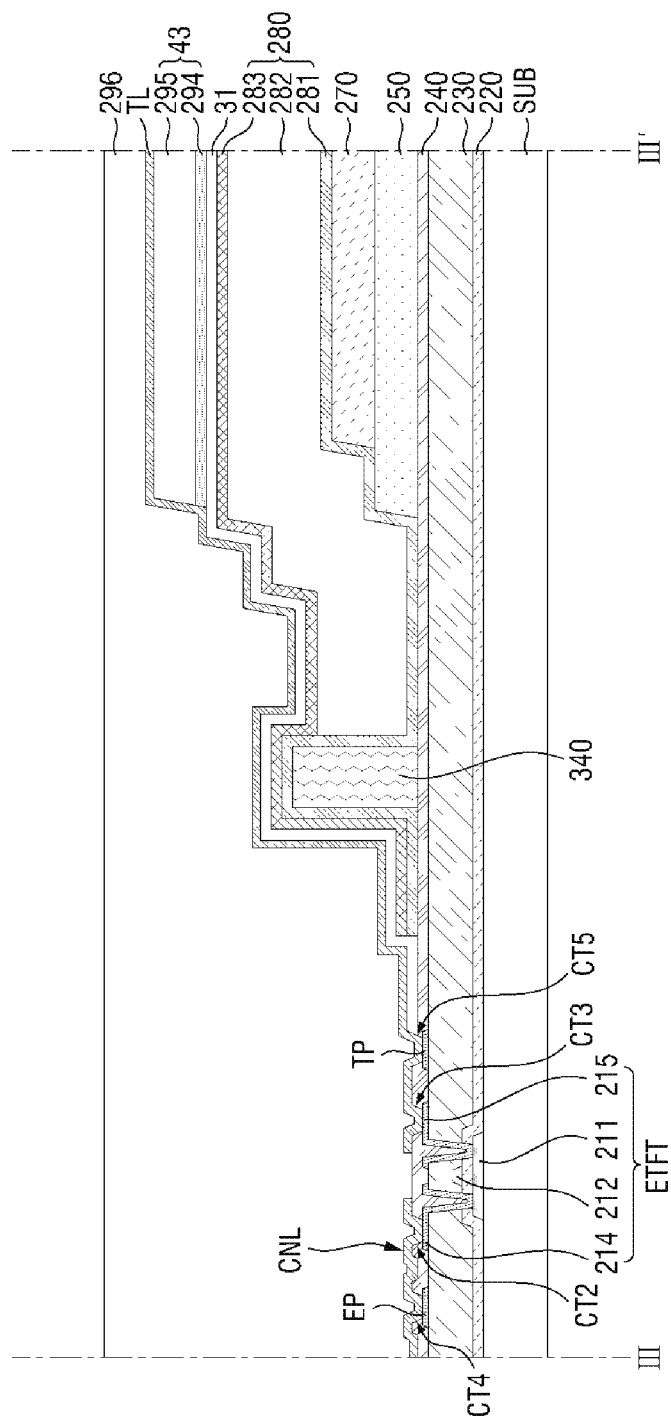
FIG. 18 is a cross-sectional view taken along the line III-III' of FIG. 2 according to an exemplary embodiment of the inventive concept.

FIG. 17 is a cross-sectional view taken along the line II-II' of FIG. 2 according to an exemplary embodiment of the inventive concept, and FIG. 18 is a cross-sectional view taken along the line III-III' of FIG. 2 according to an exemplary embodiment of the inventive concept.

Referring to FIGS. 17 and 18 together, the thin film transistor layer TFTL is formed on the substrate SUB. The thin film transistor layer TFTL may include driving thin film transistors DTFT, inspection thin film transistors ETFT, touch pads TP, inspection pads EP, a gate insulating film 220, an interlayer insulating film 230, a protective film 240, and a planarization film 250.

A first buffer film may be formed on one surface of the substrate SUB. The first buffer film is formed on one surface of the substrate SUB so as to protect the driving thin film transistors DTFT, the inspection thin film transistors ETFT, and light emitting elements from moisture permeating through the substrate SUB vulnerable to moisture permeation. The first buffer film may be formed of a plurality of alternately laminated inorganic films. For example, the first buffer film may be formed of a multi-layer film in which one or more inorganic layers, including one or more of a silicon oxide (SiOx), a silicon nitride (SiNx), and silicon oxynitride (SiON) are alternately laminated. The first buffer film may be omitted.

The driving thin film transistors DTFT and the inspection thin film transistors ETFT are formed on the first buffer film. Each of the driving thin film transistors DTFT and the inspection thin film transistors ETFT includes an active layer 211, a gate electrode 212, a source electrode 214, and a drain electrode 215. Although it is shown in FIGS. 17 and 18 that each of the driving thin film transistors DTFT and the inspection thin film transistors ETFT is formed by a top gate manner in which the gate electrode 212 is located on the active layer 211, it should be noted that the inventive concept is not limited thereto. In other words, each of the driving thin film transistors DTFT and the inspection thin film transistors ETFT may be formed by a bottom gate manner in which the gate electrode 212 is located beneath the active layer 211, or may be formed by a double gate manner in which the gate electrode 212 is located both on and beneath the active layer 211. Switching thin film transistors may also be arranged on the first buffer film.

The active layer 211 is formed on the first buffer film. The active layer 211 may be formed of a silicon-based semiconductor material or an oxide semiconductor material. A light blocking layer for blocking external light incident on the active layer 211 may be formed between the first buffer film and the active layer 211.

The gate insulating film 220 may be formed on the active layer 211. The gate insulating film 220 may be formed of an inorganic layer, for example, a silicon oxide (SiOx) layer, a silicon oxynitride (SiNx) layer, or a multi-layer thereof.

The gate electrode 212 and a gate line may be formed on the gate insulating film 220. The gate electrode 212 and the gate line may be formed of a single layer or a multi-layer including at least one of molybdenum (Mo), aluminum (Al), chromium (Cr), gold (Au), titanium (Ti), nickel (Ni), neodymium (Nd), and copper (Cu), or an alloy thereof.

The interlayer insulating film 230 may be formed on the gate electrode 212 and the gate line. The interlayer insulating film 230 may be formed of an inorganic layer, for example, a silicon oxide (SiOx) layer, a silicon oxynitride (SiNx) layer, or a multi-layer thereof.

The source electrode 214, the drain electrode 215, the data line, the touch pads TP, and the inspection pads EP may be formed on the interlayer insulating film 230. Each of the source electrode 214 and the drain electrode 215 may be connected to the active layer 211 through a contact hole that penetrates the gate insulating film 220 and the interlayer insulating film 230. The source electrode 214, the drain electrode 215, the data line, and the first and second touch pads TP and RP may be formed of a single layer or a multi-layer including at least one of molybdenum (Mo), aluminum (Al), chromium (Cr), gold (Au), titanium (Ti), nickel (Ni), neodymium (Nd), and copper (Cu), or an alloy thereof.

The protective film 240 for insulating the driving thin film transistors DTFT and the inspection thin film transistors ETFT may be formed on the source electrode 214, the drain electrode 215, the data line, the touch pads TP, and the inspection pads EP. The protective film 240 may be formed of an inorganic layer, for example, a silicon oxide (SiOx) layer, a silicon oxynitride (SiNx) layer, or a multi-layer thereof.

The planarization film 250 for planarizing a step due to the driving thin film transistors DTFT and the inspection thin film transistors ETFT may be formed on the protective film 240. The planarization film 250 may be formed of an organic film including an acryl resin, an epoxy resin, a phenolic resin, a polyamide resin, or a polyimide resin. The protective film 240 may include a first contact hole CT1 for exposing the source electrode 214 of the driving thin film transistor DTFT, second and third contact holes CT2 and CT3 for exposing the source electrode 214 and drain electrode 215 of the inspection thin film transistor ETFT, a fourth contact hole CT4 for exposing the inspection pad EP, and a fifth contact hole CT5 for exposing the touch pad TP. The touch line TL may be connected to the drain electrode 215 of the inspection thin film transistor ETFT and the touch pad TP through the third contact hole CT3 and the fifth contact hole CT5, respectively, and the connection line CNL may be connected to the source electrode 214 of the inspection thin film transistor ETFT and the inspection pad EP through the second contact hole CT2 and the fourth contact hole CT4, respectively.

A dam 340 may be formed on the protective film 240 between the touch pad TP and the driving thin film transistor DTFT. The dam 340 may serve to trap an organic film 282 of the encapsulation layer TFEL.

The light emitting element layer EML is formed on the thin film transistor layer TFTL. The light emitting element layer EML includes light emitting elements 260 and a bank 270.

The light emitting elements 260 and the bank 270 are formed on the planarization film 250. Each of the light emitting elements 260 may include an anode electrode 261, a light emitting layer 262, and a cathode electrode 263. Although it is shown in FIG. 17 that the anode electrode 261 is disposed under the light emitting layer 262 and the cathode electrode 263 is disposed over the light emitting layer 262, the inventive concept is not limited thereto. In exemplary embodiments of the inventive concept, the anode electrode 261 may be disposed over the light emitting layer 262, and the cathode electrode 263 may be disposed under the light emitting layer 262.

The anode electrode 261 may be formed on the planarization film 250. The anode electrode 261 is connected to the source electrode 214 of the thin film transistor 210 through the first contact hole CT1 penetrating the protective film 240 and the planarization film 250. The anode electrode 261 may be formed of a metal material having high reflectance such as a laminate structure (Ti/Al/Ti) of aluminum and titanium, a laminate structure (ITO/Al/ITO) of aluminum and ITO, an APC alloy, or a laminate structure (ITO/APC/ITO) of an APC and ITO. The APC alloy is an alloy of silver (Ag), palladium (Pd), and copper (Cu). ITO represents indium tin oxide.

The bank 270 may be formed to divide the anode electrode 261 on the planarization film 250 so as to define sub-pixels. The bank 270 may be formed to cover the edge of the anode electrode 261.

Each of the sub-pixels refers to an area where the anode electrode 261, the light emitting layer 262, and the cathode electrode 263 are sequentially laminated, and holes from the anode electrode 261 and electrons from the cathode electrode 263 are combined with each other in the light emitting layer 262 to emit light.

The light emitting layer 262 is formed on the anode electrode 261 and the bank 270. The light emitting layer 262 may be an organic light emitting layer including an organic material and emitting light of a predetermined color. When the light emitting layer 262 is a white light emitting layer that emits white light, the light emitting layer 262 may be a common layer formed commonly in the sub-pixels. In this case, the light emitting layer 262 may be formed to have a tandem structure of two stacks or more. Each of the stacks may include a hole transporting layer, at least one light emitting layer, and an electron transporting layer.

A charge generation layer may be formed between the stacks. The charge generation layer may include an n-type charge generation layer located adjacent to a bottom stack, and a p-type charge generation layer formed on the n-type charge generation layer and located adjacent to a top stack. The n-type charge generation layer injects electrons into the bottom stack, and the p-type charge generation layer injects holes into the top stack. The n-type charge generation layer may be an organic layer in which an organic host material having electron transport capability is doped with an alkali metal such as Li, Na, K, or Cs, or an alkaline earth metal such as Mg, Sr, Ba, or Ra. The p-type charge generation layer may be an organic layer in which an organic host material having electron transport capability is doped with a dopant.

The cathode electrode 263 is formed on the light emitting layer 262. The cathode electrode 263 may be formed to cover the light emitting layer 262. The cathode electrode 263 may be a common layer formed commonly in the sub-pixels.

The cathode electrode 263 may be formed of a transparent conductive material (TCO) such as ITO or IZO, which is light-transmissive, or a semi-transmissive conductive material such as magnesium (Mg), silver (Ag), or an alloy of magnesium (Mg) and silver (Ag). When the cathode electrode 263 is formed of a semi-transmissive conductive material, light emission efficiency may be increased by microcavities. A capping layer may be formed on the cathode electrode 263.

The encapsulation layer TFEL is formed on the light emitting element layer EML. The encapsulation layer TFEL includes an encapsulation film 280. The encapsulation film 280 may include at least one inorganic film and at least one organic film to prevent the penetration of oxygen or moisture into the light emitting layer 262 and the cathode electrode 263. For example, as shown in FIGS. 17 and 18, the encapsulation film 280 may include first and second inorganic films 281 and 283 and an organic film 282 interposed between the first and second inorganic films 281 and 283. Each of the first and second inorganic films 281 and 283 may be formed of silicon nitride, aluminum nitride, zirconium nitride, titanium nitride, hafnium nitride, tantalum nitride, silicon oxide, aluminum oxide, or titanium oxide. The organic film may be formed to have a sufficient thickness of about 7 mµ to 8 mµ so as to prevent particles from penetrating the encapsulation film 280 and entering the light emitting layer 262 and the cathode electrode 263.

A second buffer film 31 is formed on the encapsulation layer TFEL. The second buffer film 31 may be formed to cover the encapsulation film 280. In exemplary embodiments of the inventive concept, the second buffer film 31 may be formed to cover the touch pads TP, the inspection thin film transistor ETFT, and the inspection pads EP. The second buffer film 31 may be formed of an inorganic film or an organic film. When the second buffer film 31 is formed of an inorganic film, the second buffer film 31 may be formed of a silicon oxide (SiOx) film, a silicon nitride (SiNx) film, or a multi-layer thereof. When the second buffer film 31 is formed of an organic film, plasma treatment may be subjected on the second buffer film 31 to increase the surface roughness of the second buffer film 31. In this case, the area of the second buffer film 31 contacting the connection electrodes BE may be increased to increase the interfacial adhesion between the second buffer film 31 and the connection electrodes BE.

The touch sensing unit TDU is formed on the second buffer film 31. The touch sensing unit TDU includes the connection electrodes BE, the driving electrodes TE, the sensing electrodes RE, and a touch insulating film 43.

The driving electrodes TE and the sensing electrodes RE may be disposed on the same layer, and the connection electrodes BE may be disposed on a different layer from the driving electrodes TE and the sensing electrodes RE. The driving electrodes TE and the sensing electrodes RE are spaced apart from each other and electrically insulated from each other. The touch insulating film 43 includes a touch inorganic film 294 and a touch organic film 295.

For example, the connection electrodes BE may be formed on the second buffer film 31. Each of the connections electrodes BE may be formed of a single layer or a multi-layer including any one of molybdenum (Mo), aluminum (Al), chromium (Cr), gold (Au), titanium (Ti), nickel (Ni), neodymium(Nd), and copper(Cu), or an alloy thereof.

The touch inorganic film 294 may be formed on the connection electrodes BE. The touch inorganic film 294 may be formed of an inorganic layer, for example, a silicon oxide (SiOx) layer, a silicon oxynitride (SiNx) layer, or a multi-layer thereof.

The touch organic film 295 may be formed on the touch inorganic film 294. Since the interfacial adhesion between the connection electrodes BE and the touch inorganic film 294 is higher than the interfacial adhesion between the connection electrodes BE and the touch organic film 295, when the touch inorganic film 294 is formed between the connection electrodes BE and the touch organic film 295, it is possible to prevent the lifting-up of the touch organic film 295 between the connection electrodes BE and the touch organic film 295.

The driving electrodes TE and the sensing electrodes RE may be formed on the touch organic film 295. As shown in FIG. 17, the driving electrodes TE may be connected to the connection electrodes BE through sixth contact holes CT6 that penetrate the touch inorganic film 294 and the touch organic film 295 to expose the connection electrodes BE. Thus, since the driving electrodes TE are connected to the sensing electrodes RE using the connection electrodes BE in the crossing regions thereof, the driving electrodes TE and the sensing electrodes RE are not shorted to each other. The driving electrodes TE and the sensing electrodes RE may be arranged to overlap the bank 270 so as to prevent an aperture region of the sub-pixels from being reduced.

The driving lines TL may extend from the driving electrode TE, and the sensing lines RL may extend from the sensing electrode RE.

The driving electrodes TE, the sensing electrodes RE, the driving lines TL, and the sensing lines RL may be formed of a single layer or a multi-layer including any one of molybdenum (Mo), aluminum (Al), chromium (Cr), gold (Au), titanium (Ti), nickel (Ni), neodymium(Nd), and copper(Cu), or an alloy thereof.

An overcoat layer 296 for planarizing a step due to the driving electrodes TE, the sensing electrodes RE, and the connection electrodes BE may be formed on the driving electrodes TE and the sensing electrodes RE.

As described above, exemplary embodiments of the inventive concept provide a touch sensing unit capable of preventing a short between touch wiring as well as touch electrodes by arranging inspection thin film transistors in inspection pads, a display device including the touch sensing unit, and a method of aging the touch sensing unit.

While the inventive concept has been shown and described with reference to exemplary embodiments thereof, it will be apparent to those of ordinary skill in the art that various modifications, additions, and substitutions in form and details may be made thereto without departing from the scope and spirit of the inventive concept as set forth in the accompanying claims.

What is claimed is:

1. A touch sensing unit, comprising:
    a base layer including a touch sensing area and a touch peripheral area;
    a touch electrode disposed in the touch sensing area;
    a touch line disposed in the touch peripheral area and electrically connected to the touch electrode;
    an inspection pad disposed in a pad area located at one side of the touch peripheral area; and
    an inspection thin film transistor disposed in the pad area and electrically connected to the touch line and the inspection pad,
    wherein the touch line includes a plurality of touch lines sequentially arranged in a first direction in the pad area, and
    the inspection thin film transistor is disposed on only odd-numbered touch lines of the plurality of touch lines.

2. The touch sensing unit of claim 1,
    wherein the touch line includes a first driving line, a second driving line, and a third driving line, which are sequentially arranged in a first direction in the pad area,
    the inspection pad includes a first inspection pad connected to the first driving line, a second inspection pad connected to the second driving line, and a third inspection pad connected to the third driving line,
    the inspection thin film transistor includes a first inspection thin film transistor, a second inspection thin film transistor, a third inspection thin film transistor, and a fourth inspection thin film transistor, and
    a first electrode of the first inspection thin film transistor is connected to the first driving line, and a second electrode of the first inspection thin film transistor is connected to the first inspection pad.

3. The touch sensing unit of claim 2,
    wherein a first electrode of the second inspection thin film transistor is connected to the third driving line, and a second electrode of the second inspection thin film transistor is connected to the third inspection pad.

4. The touch sensing unit of claim 3,
wherein the touch line further includes a first sensing line, a second sensing line, and a third sensing line, which are sequentially arranged in the first direction in the pad area,
the inspection pad includes a fourth inspection pad connected to the first sensing line, a fifth inspection pad connected to the second sensing line, and a sixth inspection pad connected to the third sensing line, and
a first electrode of the third inspection thin film transistor is connected to the first sensing line, and a second electrode of the third inspection thin film transistor is connected to the fourth inspection pad.

5. The touch sensing unit of claim 4,
wherein a first electrode of the fourth inspection thin film transistor is connected to the third sensing line, and a second electrode of the fourth inspection thin film transistor is connected to the sixth inspection pad.

6. The touch sensing unit of claim 5,
wherein the inspection pad further includes a seventh inspection pad, and
the seventh inspection pad is connected to a control electrode of each of the first inspection thin film transistor, the second inspection thin film transistor, the third inspection thin film transistor, and the fourth inspection thin film transistor.

7. The touch sensing unit of claim 6,
wherein the inspection thin film transistor further includes a fifth inspection thin film transistor and a sixth inspection thin film transistor, and
a first electrode of the fifth inspection thin film transistor is connected to the second driving line, and a second electrode of the fifth inspection thin film transistor is connected to the second inspection pad.

8. The touch sensing unit of claim 7,
wherein a first electrode of the sixth inspection thin film transistor is connected to the second sensing line, and a second electrode of the sixth inspection thin film transistor is connected to the fifth inspection pad.

9. The touch sensing unit of claim 8,
wherein the inspection pad further includes an eighth inspection pad, and
the eighth inspection pad is connected to a control electrode of each of the fifth inspection thin film transistor and the sixth inspection thin film transistor.

10. The touch sensing unit of claim 1, comprising:
a touch pad disposed between the touch line and the inspection thin film transistor and electrically connected to the touch line and the inspection thin film transistor.

11. The touch sensing unit of claim 1, comprising:
a touch pad disposed between the inspection thin film transistor and the inspection pad and electrically connected to the inspection thin film transistor and the inspection pad.

12. A display device, comprising:
a substrate including a display area and a non-display area;
a thin film transistor layer disposed on the substrate and including a driving thin film transistor and an inspection thin film transistor;
a light emitting element layer disposed on the thin film transistor layer; and
a touch sensing unit disposed on the light emitting element layer,
wherein the driving thin film transistor is disposed in the display area, and the inspection thin film transistor is disposed in the non-display area and on the same layer as the driving thin film transistor.

13. The display device of claim 12,
wherein the touch sensing unit includes a touch line, and the touch line is electrically connected to the inspection thin film transistor.

14. A method of aging a touch sensing unit, comprising:
applying a gate-off voltage to a first node inspection pad connected to a first node; and
inputting first aging signals to inspection pads connected to a plurality of touch lines to form a potential difference between the plurality of touch lines,
wherein inspection thin film transistors are connected to touch lines of the plurality of touch lines, and
each inspection pad is connected to a source/drain electrode of at most one of the inspection thin film transistors.

15. The method of claim 14,
wherein the plurality of touch lines are sequentially arranged in a first direction,
the inspection thin film transistors are connected only to odd-numbered touch lines of the plurality of touch lines, and
the gate-off voltage is applied to the inspection thin film transistors connected to the first node.

16. The method of claim 15,
wherein the plurality of touch lines include a first driving line, a second driving line, and a third driving line, which are sequentially arranged in the first direction,
the inspection pads include a first inspection pad connected to the first driving line, a second inspection pad connected to the second driving line, and a third inspection pad connected to the third driving line, and
the inspection thin film transistors include a first inspection thin film transistor connected to the first driving line and the first inspection pad and a second inspection thin film transistor connected to the third driving line and the third inspection pad.

17. The method of claim 16,
wherein the plurality of touch lines further include a first sensing line, a second sensing line, and a third sensing line, which are sequentially arranged in the first direction,
the inspection pads further include a fourth inspection pad connected to the first sensing line, a fifth inspection pad connected to the second sensing line, and a sixth inspection pad connected to the third sensing line, and
the inspection thin film transistors further include a third inspection thin film transistor connected to the first sensing line and the fourth inspection pad and a fourth inspection thin film transistor connected to the third sensing line and the sixth inspection pad.

18. The method of claim 17,
wherein a control electrode of each of the first inspection thin film transistor, the second inspection thin film transistor, the third inspection thin film transistor, and the fourth inspection thin film transistor is connected to the first node.

19. The method of claim 18, further comprising:
applying a gate-on voltage to the first node inspection pad connected to the first node; and
applying the first aging signals to each of the first to third inspection pads, and applying second aging signals to each of the fourth to sixth inspection pads.

* * * * *